(12) United States Patent
Riddle

(10) Patent No.: US 8,843,634 B2
(45) Date of Patent: Sep. 23, 2014

(54) PARTITION CONFIGURATION AND CREATION MECHANISMS FOR NETWORK TRAFFIC MANAGEMENT DEVICES

(75) Inventor: Guy Riddle, Los Gatos, CA (US)

(73) Assignee: Blue Coat Systems, Inc., Sunnyvale, CA (US)

(*) Notice: Subject to any disclaimer, the term of this patent is extended or adjusted under 35 U.S.C. 154(b) by 556 days.

(21) Appl. No.: 13/080,928

(22) Filed: Apr. 6, 2011

(65) Prior Publication Data

US 2011/0182180 A1    Jul. 28, 2011

Related U.S. Application Data

(63) Continuation of application No. 11/241,007, filed on Sep. 30, 2005, now Pat. No. 7,925,756.

(51) Int. Cl.
*G06F 15/173* (2006.01)
*H04L 12/873* (2013.01)
*H04L 12/801* (2013.01)
*H04L 12/24* (2006.01)
*H04L 12/869* (2013.01)
*H04L 12/851* (2013.01)

(52) U.S. Cl.
CPC .......... *H04L 41/0893* (2013.01); *H04L 47/522* (2013.01); *H04L 47/10* (2013.01); *H04L 41/0896* (2013.01); *H04L 47/2441* (2013.01); *H04L 47/60* (2013.01)
USPC ............. 709/226; 340/2.8; 340/2.9; 370/431; 711/150

(58) Field of Classification Search
CPC ........................................................ H04L 65/80
USPC .......................................................... 709/226
See application file for complete search history.

(56) References Cited

U.S. PATENT DOCUMENTS

| | | | |
|---|---|---|---|
| 6,412,000 B1 * | 6/2002 | Riddle et al. | 709/224 |
| 6,430,154 B1 | 8/2002 | Hunt et al. | |
| 6,591,299 B2 | 7/2003 | Riddle et al. | |
| 6,647,419 B1 | 11/2003 | Mogul | |
| 6,735,633 B1 * | 5/2004 | Welch et al. | 709/233 |
| 7,453,804 B1 | 11/2008 | Feroz et al. | |
| 2003/0061263 A1 * | 3/2003 | Riddle | 709/104 |
| 2004/0199635 A1 | 10/2004 | Ta et al. | |
| 2005/0249220 A1 | 11/2005 | Olsen et al. | |
| 2006/0080273 A1 * | 4/2006 | Degenaro et al. | 707/1 |
| 2006/0190482 A1 * | 8/2006 | Kishan et al. | 707/103 Y |

\* cited by examiner

*Primary Examiner* — Oleg Survillo
*Assistant Examiner* — Joseph M Cousins
(74) *Attorney, Agent, or Firm* — Baker Botts L.L.P.

(57) ABSTRACT

Partition configuration and creation mechanisms for network traffic management devices. In some implementations, the present invention enhances the predictability of partition hierarchies that use weighting values and fixed rate guarantees. In some implementations, the present invention includes a configuration interface that constrains the manner in which partitions can be configured to achieve predictable and efficient results. In some implementations, the present invention includes a partition creation and deletion layer that operates to dynamically create partitions based on one or more partition patterns.

13 Claims, 10 Drawing Sheets

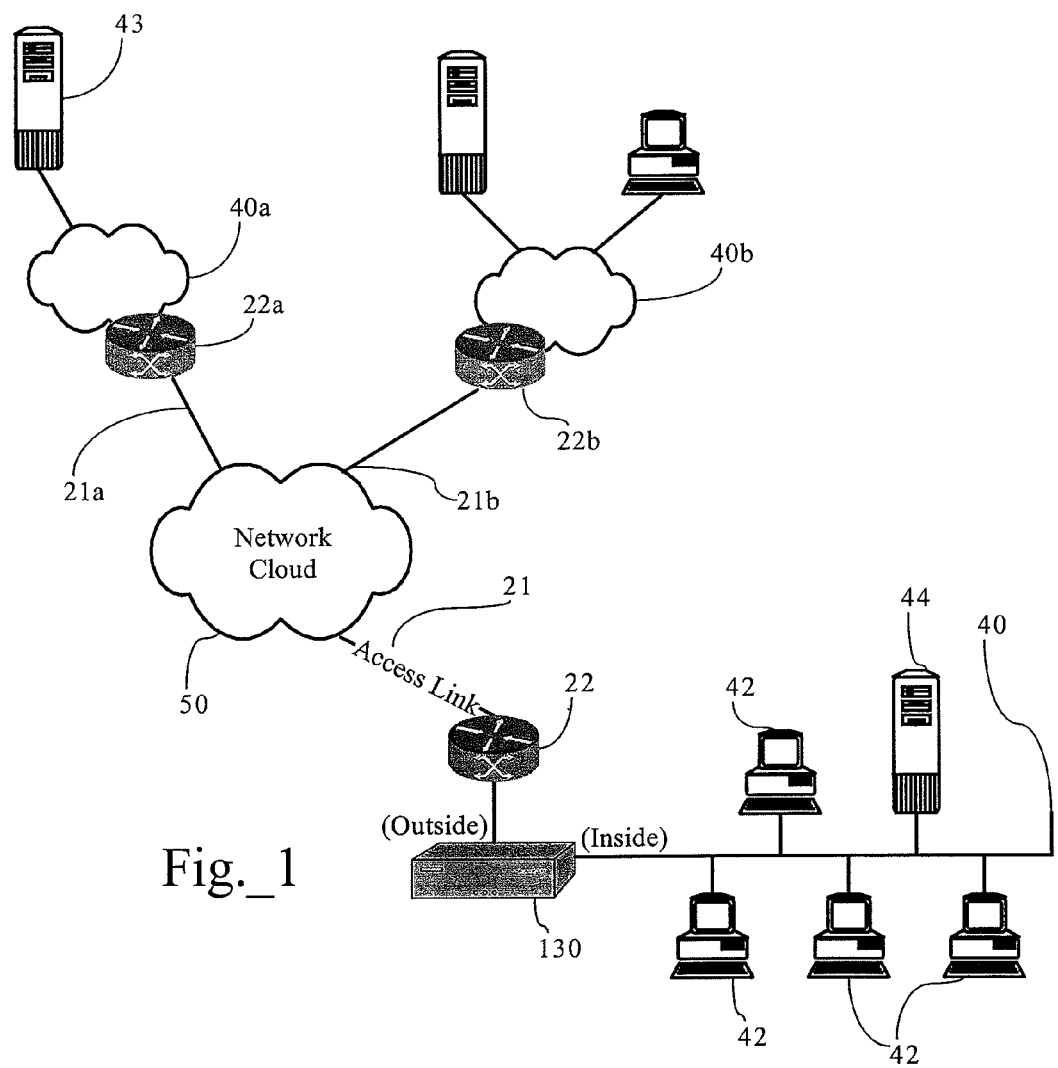
Fig._1

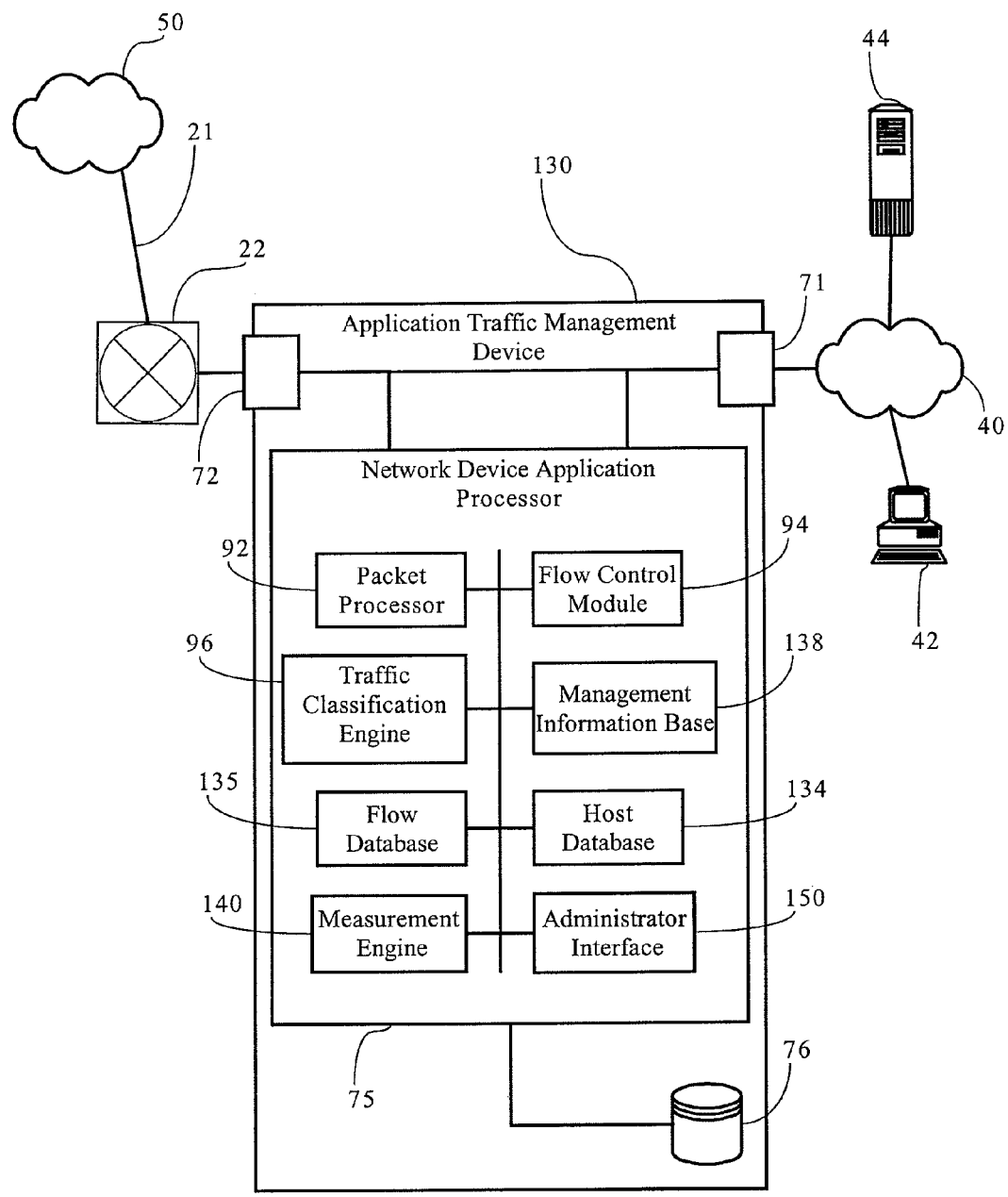
Fig._2

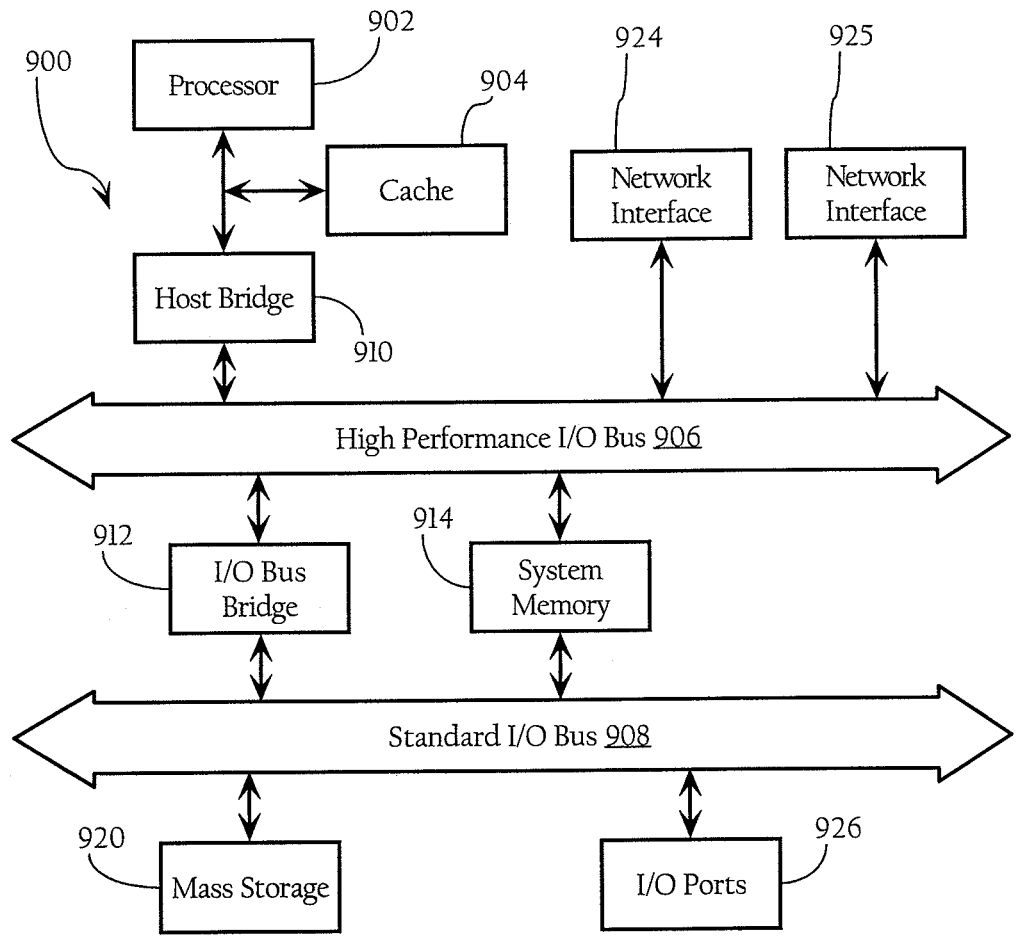
Fig._2A

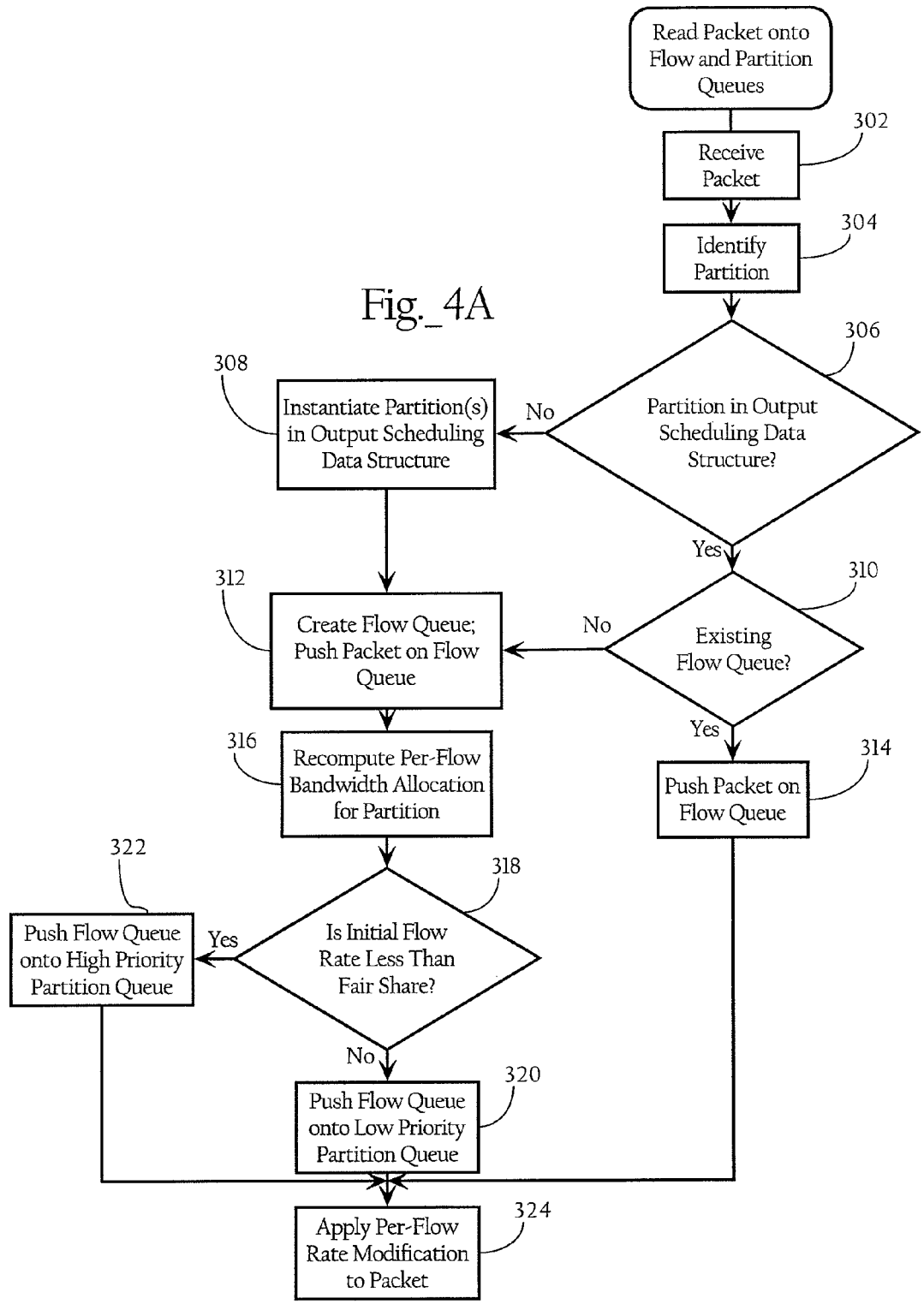
Fig._4A

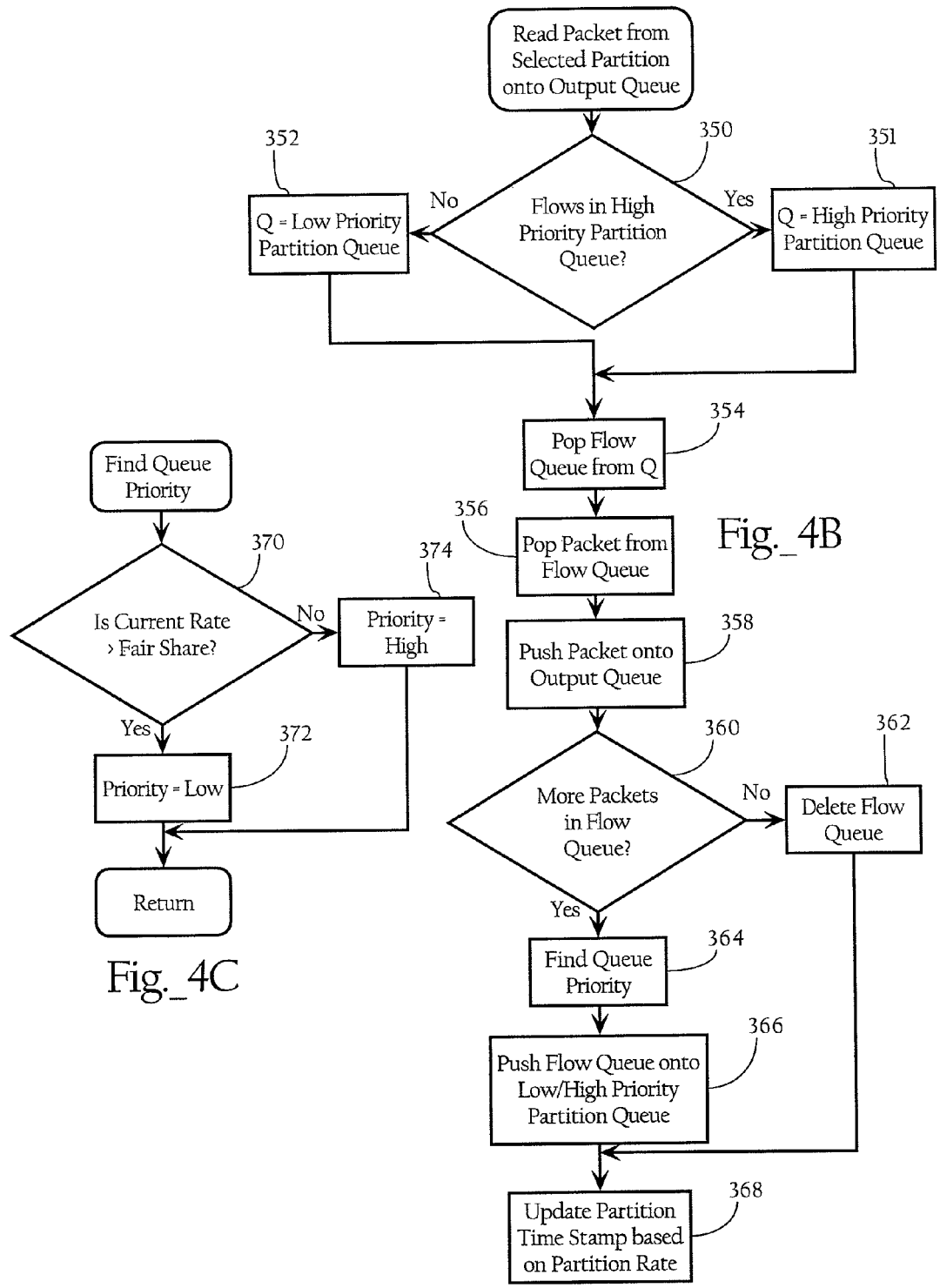

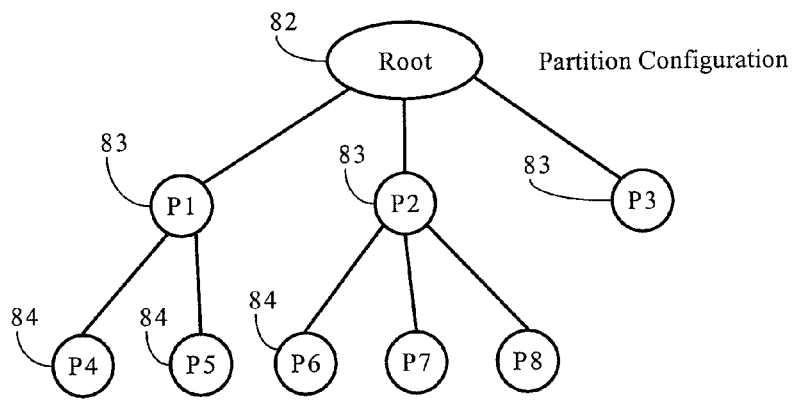
Fig._6
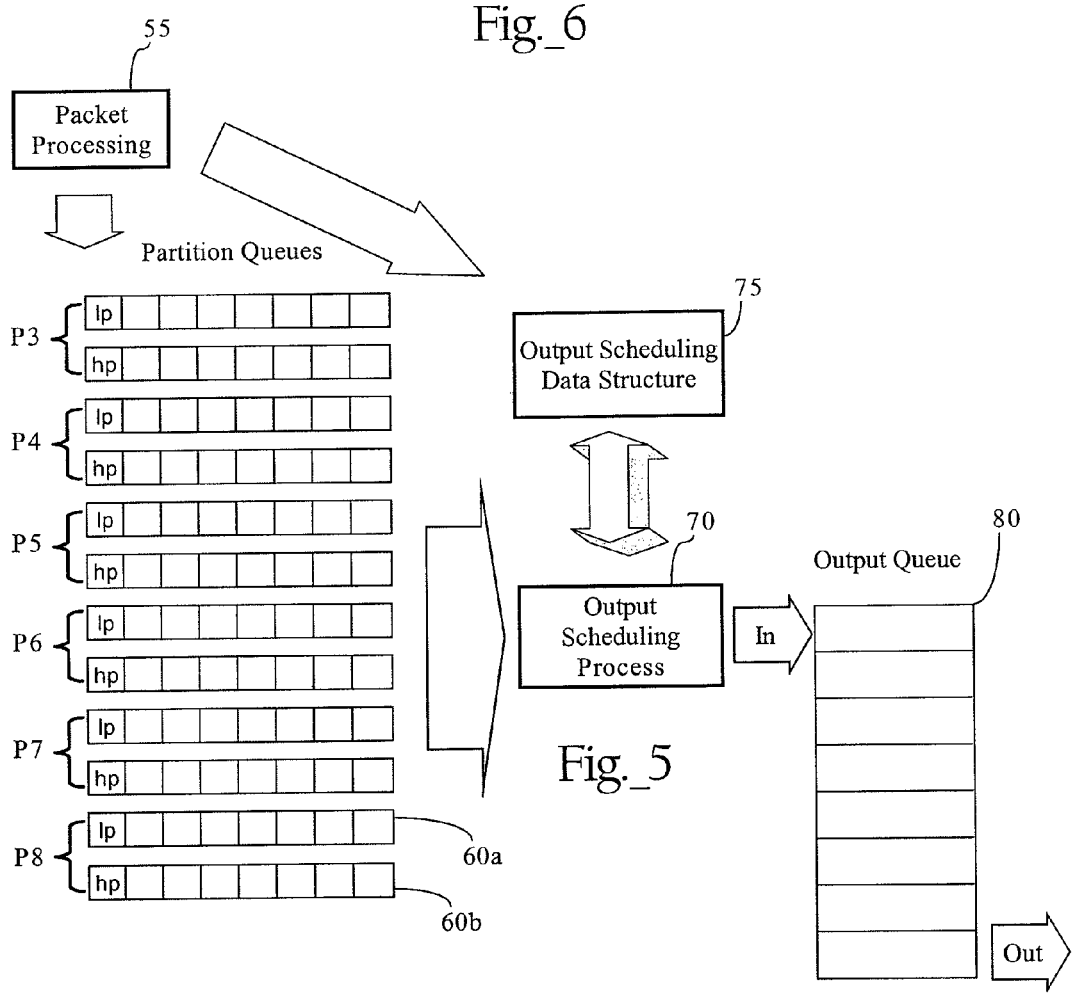
Fig._5

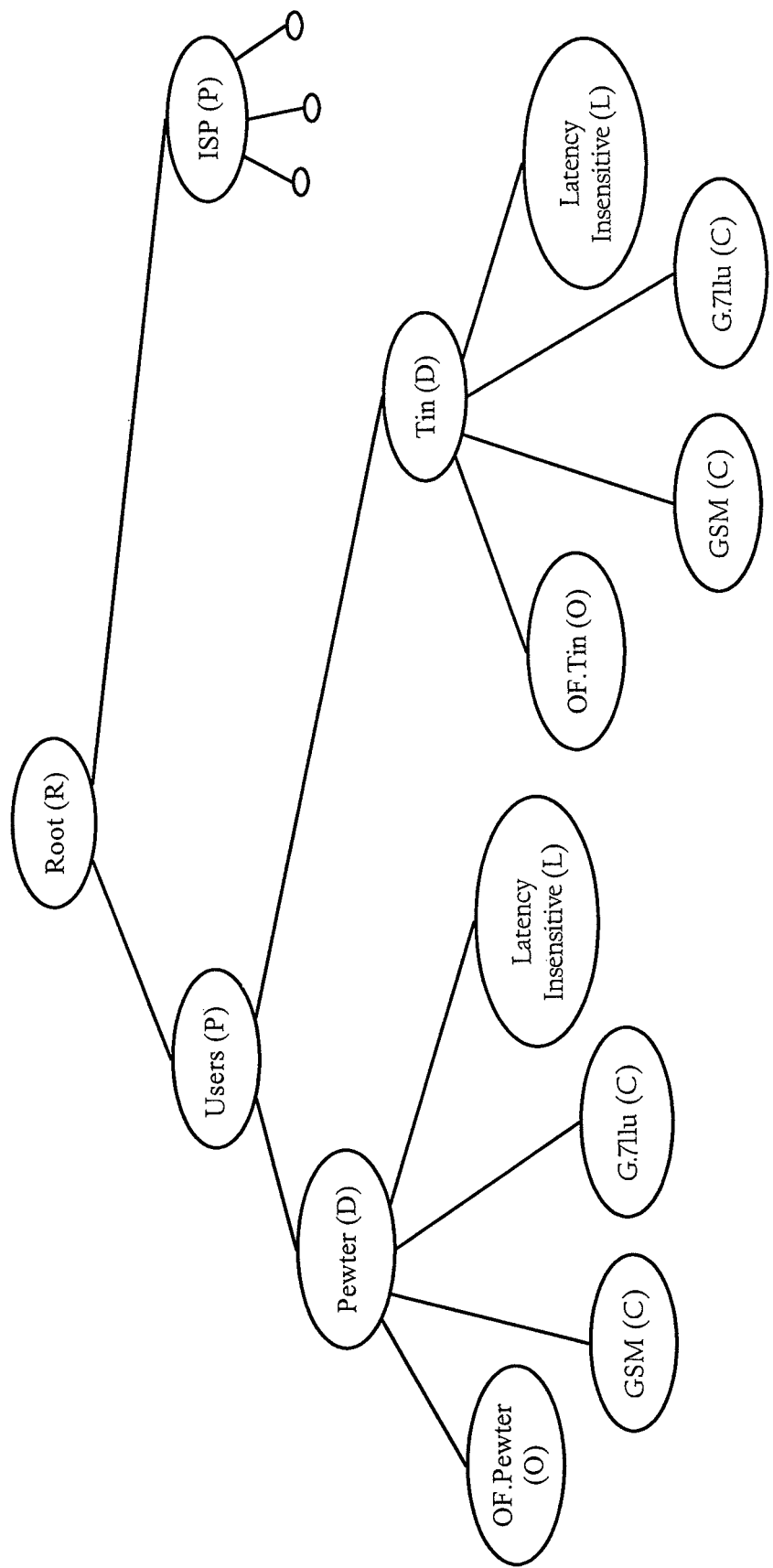
Fig._7A

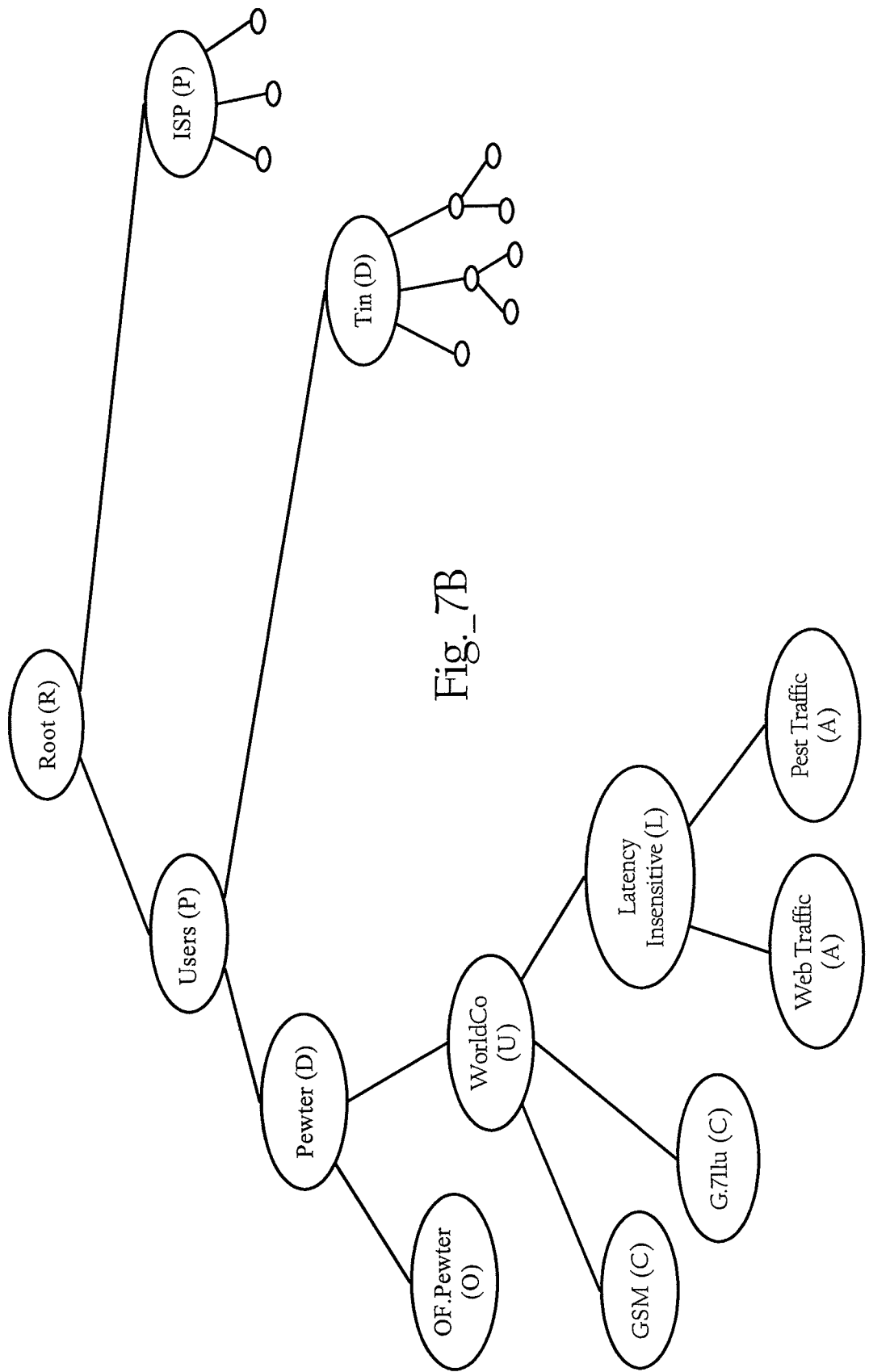
Fig._7B

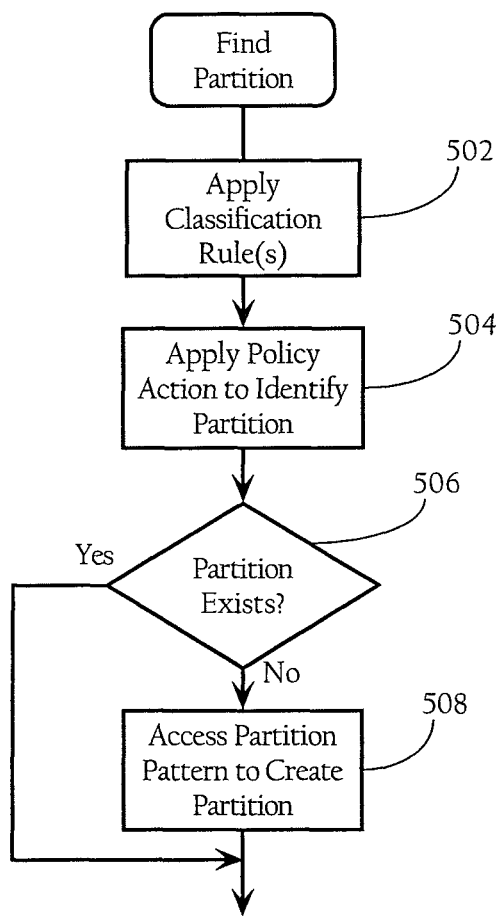
Fig._8

PARTITION CONFIGURATION AND CREATION MECHANISMS FOR NETWORK TRAFFIC MANAGEMENT DEVICES

CROSS-REFERENCE TO RELATED APPLICATIONS

This application is a continuation of U.S. application Ser. No. 11/241,007 filed Sep. 30, 2005, entitled "Partition Configuration and Creation Mechanisms for Network Traffic Management Devices," now U.S. Pat. No. 7,925,756.

This application makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/198,051, in the name of Guy Riddle, entitled "Method for Automatically Determining a Traffic Policy in a Packet Communications Network;"

U.S. patent application Ser. No. 09/206,772, now U.S. Pat. No. 6,456,360, in the name of Robert L. Packer, Brett D. Galloway and Ted Thi, entitled "Method for Data Rate Control for Heterogeneous or Peer Internetworking;"

U.S. patent application Ser. No. 09/710,442, in the name of Todd Krautkremer and Guy Riddle, entitled "Application Service Level Mediation and Method of Using the Same;"

U.S. patent application Ser. No. 09/966,538, in the name of Guy Riddle, entitled "Dynamic Partitioning of Network Resources;"

U.S. patent application Ser. No. 10/015,826 in the name of Guy Riddle, entitled "Dynamic Tunnel Probing in a Communications Network;"

U.S. patent application Ser. No. 10/039,992, in the name of Michael J. Quinn and Mary L. Laier, entitled "Method and Apparatus for Fast Lookup of Related Classification Entities in a Tree-Ordered Classification Hierarchy;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/178,617, in the name of Robert E. Purvy, entitled "Methods, Apparatuses and Systems Facilitating Analysis of Network Device Performance;"

U.S. patent application Ser. No. 10/155,936 now U.S. Pat. No. 6,591,299, in the name of Guy Riddle, Robert L. Packer, and Mark Hill, entitled "Method For Automatically Classifying Traffic With Enhanced Hierarchy In A Packet Communications Network;"

U.S. patent application Ser. No. 10/236,149, in the name of Brett Galloway and George Powers, entitled "Classification Data Structure enabling Multi-Dimensional Network Traffic Classification and Control Schemes;"

U.S. patent application Ser. No. 10/334,467, in the name of Mark Hill, entitled "Methods, Apparatuses and Systems Facilitating Analysis of the Performance of Network Traffic Classification Configurations;"

U.S. patent application Ser. No. 10/453,345, in the name of Scott Hankins, Michael R. Morford, and Michael J. Quinn, entitled "Flow-Based Packet Capture;"

U.S. patent application Ser. No. 10/676,383 in the name of Guy Riddle, entitled "Enhanced Flow Data Records Including Traffic Type Data;"

U.S. patent application Ser. No. 10/720,329, in the name of Weng-Chin Yung, Mark Hill and Anne Cesa Klein, entitled "Heuristic Behavior Pattern Matching of Data Flows in Enhanced Network Traffic Classification;"

U.S. patent application Ser. No. 10/812,198 in the name of Michael Robert Morford and Robert E. Purvy, entitled "Adaptive, Application-Aware Selection of Differentiated Network Services;"

U.S. patent application Ser. No. 10/843,185 in the name of Guy Riddle, Curtis Vance Bradford and Maddie Cheng, entitled "Packet Load Shedding;"

U.S. patent application Ser. No. 10/938,435 in the name of Guy Riddle, entitled "Classification and Management of Network Traffic Based on Attributes Orthogonal to Explicit Packet Attributes;"

U.S. patent application Ser. No. 11/027,744 in the name of Mark Urban, entitled "Adaptive Correlation of Service Level Agreement and Network Application Performance;" and U.S. application Ser. No. 11/053,596 in the name of Azeem Feroz, Wei-Lung Lai, Roopesh Varier, James Stabile and Eric Okholm, entitled "Aggregate Network Resource Utilization Control Scheme."

FIELD OF THE INVENTION

The present invention relates to network traffic management systems and, more particularly, to methods, apparatuses and systems directed to partition configuration and creation mechanisms that enhance the predictability and use of network resource allocation schemes.

BACKGROUND OF THE INVENTION

Enterprises have become increasingly dependent on computer network infrastructures to provide services and accomplish mission-critical tasks. Indeed, the performance, security, and efficiency of these network infrastructures have become critical as enterprises increase their reliance on distributed computing environments and wide area computer networks. To that end, a variety of network devices have been created to provide data gathering, reporting, and/or operational functions, such as firewalls, gateways, packet capture devices, bandwidth management devices, application traffic monitoring devices, and the like. For example, the TCP/IP protocol suite, which is widely implemented throughout the world-wide data communications network environment called the Internet and many wide and local area networks, omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily.

To facilitate monitoring, management and control of network environments, a variety of network devices, applications, technologies and services have been developed. For example, certain data flow rate control mechanisms have been developed to provide a means to control and optimize efficiency of data transfer as well as allocate available bandwidth among a variety of business enterprise functionalities. For example, U.S. Pat. No. 6,038,216 discloses a method for explicit data rate control in a packet-based network environment without data rate supervision. Data rate control directly moderates the rate of data transmission from a sending host, resulting in just-in-time data transmission to control inbound traffic and buffering of packets, and reduce the inefficiencies associated with dropped packets. Bandwidth management devices also allow for explicit data rate control for flows associated with a particular traffic classification. For example, U.S. Pat. No. 6,412,000, above, discloses automatic classification of network traffic for use in connection with bandwidth allocation mechanisms. U.S. Pat. No. 6,046,980 discloses systems and methods allowing for application layer control of bandwidth utilization in packet-based computer networks. For example, bandwidth management devices allow network administrators to specify policies operative to control and/or prioritize the bandwidth allocated to individual data flows according to traffic classifications. In addition, certain bandwidth management devices, as well as certain routers, allow network administrators to specify aggregate bandwidth utilization controls to divide available bandwidth into partitions. With some network devices, these partitions can be configured to provide a minimum bandwidth guarantee, and/or cap bandwidth, as to a particular class of traffic. An administrator specifies a traffic class (such as FTP data, or data flows involving a specific user or network application) and the size of the reserved virtual link—i.e., minimum guaranteed bandwidth and/or maximum bandwidth. Such partitions can be applied on a per-application basis (protecting and/or capping bandwidth for all traffic associated with an application) or a per-user basis (controlling, prioritizing, protecting and/or capping bandwidth for a particular user). In addition, certain bandwidth management devices allow administrators to define a partition hierarchy by configuring one or more partitions dividing the access link and further dividing the parent partitions into one or more child partitions. U.S. patent application Ser. No. 10/108,085 discloses data structures and methods for implementing a partition hierarchy.

Certain network traffic management devices, such as the PacketShaper® network traffic management device, offered by Packeteer®, Inc. of Cupertino, Calif., support the concurrent use of aggregate bandwidth policies (e.g., partitions), and per-flow bandwidth policies, such as rate policies enforced by the TCP Rate control technologies disclosed in U.S. Pat. No. 6,038,216. A partition is essentially a bandwidth allocation and queuing mechanism. That is, after a packet processor classifies each packet and enqueues each packet onto a partition queue associated with the appropriate partition, another process, typically, loops through the partition queues to dequeue packets off the queues and populate an output queue. Aggregate bandwidth allocation among the different partitions essentially establishes a preference by which a flow control mechanism arbitrates among the corresponding partition queues. For example, a flow control module, while arbitrating among the partition queues, may read more packets from partitions having a higher allocation of bandwidth relative to partitions that have lower allocations. For example, as disclosed in U.S. application Ser. No. 10/108,085, incorporated by reference above, the bandwidth allocated to a given partition affects the rate at which the partition is selected by an output scheduling process and therefore the length of time packets are buffered in the corresponding partition queue. In addition, TCP Rate Control technologies can be used to effect per-flow rate policies to control or influence the rate at which packets are received at a network device and, therefore, use of inbound network bandwidth and the amount of data that is queued at any given time.

While partitions and per-flow rate policies are effective for their intended purposes, the proper configuration of partitions in conjunction with per-flow policies can be problematic. For example, network traffic application systems allow users to configure minimum and/or maximum bandwidth guarantees for one or more partitions. To simply configuration, some network traffic management systems also allow users to configure a weighting or priority scheme for partitions and/or data flows that indicate the relative importance of the network traffic falling within a partition or matching a given traffic classification. The network traffic management device itself applies these weighting parameters using conventional algorithms. During execution, the weighing or priority values, however, are often difficult to reconcile with the minimum and maximum bandwidth guarantees corresponding to one or more partitions, as it can become problematic to allocate bandwidth to data flows using weights, while at the same time observing the minimum and/or maximum guarantees associated with one or more partitions. The resulting effect from various configurations can be unpredictable, and also far from what the user intended.

In light of the foregoing, a need in the art exists for methods, apparatuses and systems directed to bandwidth control mechanism that addresses the problems discussed above. Embodiments of the present invention substantially fulfill this need.

SUMMARY OF THE INVENTION

The present invention provides methods, apparatuses and systems directed to partition configuration and creation mechanisms for network traffic management devices. In some implementations, the present invention enhances the predictability of partition hierarchies that use weighting values and fixed rate guarantees. In some implementations, the present invention includes a configuration interface that constrains the manner in which partitions can be configured to achieve predictable and efficient results. In some implementations, the present invention includes a partition creation and deletion layer that operates to dynamically create partitions based on one or more partition patterns.

DESCRIPTION OF THE DRAWING(S)

FIG. 1 is a functional block diagram illustrating a computer network system architecture in which an embodiment of the present invention may operate.

FIG. 2 is a functional block diagram illustrating the functionality of a network traffic management device, according to one implementation of the present invention.

FIG. 2A is functional block diagram illustrating the hardware components of a network device according to one implementation of the present invention.

FIG. 4A is a flow chart diagram illustrating a process involving placing a packet onto a flow queue and a partition queue.

FIG. 4B is a flow chart diagram providing a method involving scheduling a packet for output from an network traffic management device.

FIG. 4C is a flow chart diagram illustrating the decisional logic associated with placing a flow queue onto a high priority or low priority partition queue.

FIG. 5 is a process flow diagram illustrating the overall process flow associated with the scheduling of packets for output.

Figure 3:
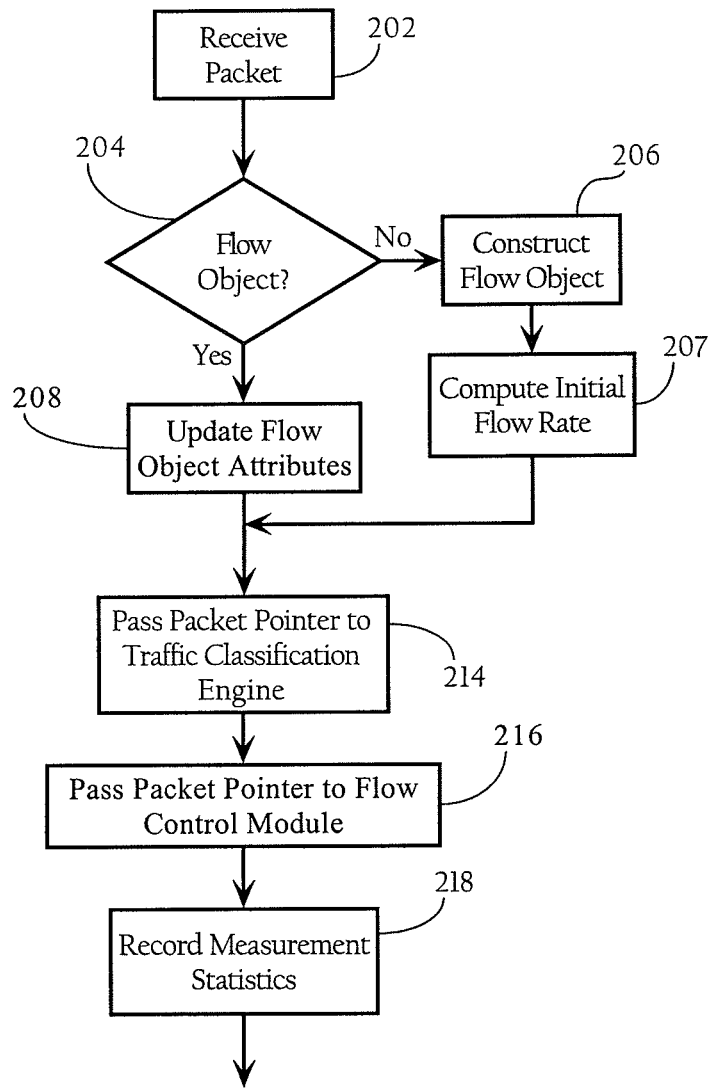
FIG. 3 is a flow chart diagram showing a method, according to one implementation of the present invention, directed to processing data flows.

FIG. 6 sets forth an exemplary hierarchical partition configuration according to an embodiment of the present invention.

FIGS. 7A and 7B illustrate exemplary hierarchical partition configurations according to another embodiment of the present invention.

FIG. 8 is a flow chart diagram illustrating operation of a partition creation and deletion layer according to one implementation of the present invention.

DESCRIPTION OF PREFERRED EMBODIMENT(S)

FIG. 1 illustrates an exemplary network environment in which embodiments of the present invention may operate. Of course, the present invention can be applied to a variety of network architectures. FIG. 1 illustrates, for didactic purposes, a network 50, such as wide area network, interconnecting a first enterprise network 40, supporting a central operating or headquarters facility, and a second enterprise network 40a, supporting a branch office facility. Network 50 may also be operably connected to other networks, such as network 40b, associated with the same administrative domain as networks 40, 40a, or a different administrative domain. As FIGS. 1 and 2 show, the first network 40 interconnects several TCP/IP end systems, including client devices 42 and server device 44, and provides access to resources operably connected to computer network 50 via router 22 and access link 21. Access link 21 is a physical and/or logical connection between two networks, such as computer network 50 and network 40. The computer network environment, including network 40 and network 50 is a packet-based communications environment, employing TCP/IP protocols, and/or other suitable protocols, and has a plurality of interconnected digital packet transmission stations or routing nodes. First network 40, and networks 40a & 40b, can each be a local area network, a wide area network, or any other suitable network. As FIGS. 1 and 2 illustrate, network traffic management device 130, in one implementation, is deployed at the edge of network 40. As discussed more fully below, network traffic management device 130 is operative to classify and manage data flows traversing access link 21. In one implementation, network traffic management device 130 also includes functionality operative to monitor the performance of the network (such as network latency) and/or network applications. Network traffic management device 130 may be disposed at a variety of locations in a network environment to control data flow and partition access to resources.

As FIG. 2 illustrates, network traffic management device 130, in one implementation, comprises network device application processor 75, and first and second network interfaces 71, 72, which operably connect network traffic management device 130 to the communications path between router 22 and network 40. Network device application processor 75 generally refers to the functionality implemented by network traffic management device 130, such as network traffic management functionality described herein. As described in more detail below, in one embodiment, network device application processor 75 is a combination of hardware and software, such as a central processing unit, memory, a system bus, an operating system, device drivers, and one or more software modules implementing the functions performed by network traffic management device 130. For didactic purposes, network traffic management device 130 is configured to manage network traffic traversing access link 21. The above-identified patents and patent applications, incorporated by reference herein, disclose various functionalities and features that may be incorporated into network traffic management devices according to various implementations of the present invention.

In one embodiment, first and second network interfaces 71, 72 are the hardware communications interfaces that receive and transmit packets over the computer network environment. In one implementation, first and second network interfaces 71, 72 reside on separate network interface cards operably connected to the system bus of network traffic management device 130. In another implementation, first and second network interfaces reside on the same network interface card. In addition, the first and second network interfaces 71, 72 can be wired network interfaces, such as Ethernet (IEEE 802.3) interfaces, and/or wireless network interfaces, such as IEEE 802.11, BlueTooth, satellite-based interfaces, and the like. As FIG. 2 illustrates, network traffic management device 130, in one embodiment, includes persistent memory 76, such as a hard disk drive or other suitable memory device, such writable CD, DVD, or tape drives. In other implementations, network traffic management device 130 can include additional network interfaces, beyond network interfaces 71 and 72, to support additional access links or other functionality. Furthermore, U.S. application Ser. No. 10/843,185 provides a description of the operation of various modules (according to one possible implementation of the present invention), such as network interface drivers, and data structures for receiving into memory and processing packets encountered at network interfaces 71, 72.

FIG. 2A illustrates for didactic purposes an exemplary computing platform, and hardware architecture, for network device 30. In one implementation, network device 30 comprises a processor 902, a system memory 914, network interfaces 924 & 925, and one or more software applications (including network device application 75 shown in FIG. 2) and drivers enabling the functions described herein.

The present invention can be implemented on a wide variety of computer system architectures. For example, FIG. 2A illustrates, hardware system 900 having components suitable for network device 30 in accordance with one implementation of the present invention. In the illustrated embodiment, the hardware system 900 includes processor 902 and a cache memory 904 coupled to each other as shown. Additionally, the hardware system 900 includes a high performance input/output (I/O) bus 906 and a standard I/O bus 908. Host bridge 910 couples processor 902 to high performance I/O bus 906, whereas I/O bus bridge 912 couples the two buses 906 and 908 to each other. Coupled to bus 906 are network/communication interface 924, and system memory 914. The hardware system may further include video memory (not shown) and a display device coupled to the video memory. Coupled to bus 908 are mass storage 920 and I/O ports 926. The hardware system may optionally include a keyboard and pointing device (not shown) coupled to bus 908. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of computer hardware system 900 perform their conventional functions known in the art. In particular, network interfaces 924, 925 are used to provide communication between system 900 and any of a wide range of networks, such as an Ethernet (e.g., IEEE 802.3) network, etc. Mass storage 920 is used to provide permanent storage for the data and programming instructions to perform the above described functions implemented in the system controller, whereas system memory 914 (e.g., DRAM) is used to provide temporary storage for the data and programming instructions when executed by processor 902. I/O ports 926 are one or more serial and/or parallel communication ports used to provide communication between additional peripheral devices, which may be coupled to hardware system 900.

Hardware system 900 may include a variety of system architectures, and various components of hardware system 900 may be rearranged. For example, cache 904 may be on-chip with processor 902. Alternatively, cache 904 and processor 902 may be packed together as a "processor module," with processor 902 being referred to as the "processor core." Furthermore, certain implementations of the present invention may not require nor include all of the above components. For example, the peripheral devices shown coupled to standard I/O bus 908 may be coupled to high performance I/O bus 906. In addition, in some implementations only a single bus may exist with the components of hardware system 900 being coupled to the single bus. Furthermore, additional components may be included in system 900, such as additional processors, storage devices, or memories.

As discussed above, in one embodiment, the operations of the network traffic management device 130 described herein are implemented as a series of software routines run by hardware system 900. These software routines comprise a plurality or series of instructions to be executed by a processor in a hardware system, such as processor 902. Initially, the series of instructions are stored on a storage device, such as mass storage 920. However, the series of instructions can be stored on any conventional storage medium, such as a diskette, CD-ROM, ROM, etc. Furthermore, the series of instructions need not be stored locally, and could be received from a remote storage device, such as a server on a network, via network/communication interface 924. The instructions are copied from the storage device, such as mass storage 920, into memory 914 and then accessed and executed by processor 902. An operating system manages and controls the operation of system 900, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other conventional operating systems, such as the Apple Macintosh Operating System, available from Apple Computer Inc. of Cupertino, Calif., UNIX operating systems, LINUX operating systems, and the like. Of course, other implementations are possible. For example, the functionality of network device 30 may be implemented by a plurality of server blades communicating over a backplane.

As FIG. 2 illustrates, network device application processor 75, in one implementation, includes a packet processor 92, flow control module 94, and traffic classification engine 96. Network device application processor 75, in one implementation, further comprises host database 134, flow database 135, measurement engine 140, management information base 138, and administrator interface 150. In one embodiment, the packet processor 92 is operative to process data packets, such as detecting new data flows, parsing the data packets for various attributes (such as source and destination addresses, and the like) and storing packet attributes in a buffer structure, and maintaining one or more flow variables or statistics (such as packet count, current rate, etc.) in connection with the data flows and/or the source/destination hosts. The traffic classification engine 96, as discussed more fully below, is operative to classify data flows, such as identify network applications corresponding to the flows, based on one or more attributes of the data flows. In one implementation, traffic classification engine 96 is operative to apply one or more policy actions that are operative to identify partition names based on one or more flow attributes. In one implementation, flow control module 94 is operative, as described in more detail below, to apply aggregate and per-flow bandwidth utilization controls to data flows traversing the access link 21 in the inbound and/or outbound directions.

As discussed above, in one implementation, network device application processor 75 further comprises measurement engine 140, management information base (MIB) 138, and administrator interface 150. Management information base 138 is a database of standard and extended network objects related to the operation of network traffic management device 130. Measurement engine 140 maintains measurement and statistical data relating to operation of network traffic management device 130 to allow for monitoring of bandwidth utilization and network performance across access link 21 with respect to a plurality of bandwidth utilization and other network statistics on an aggregate and/or per-partition level. In one implementation, measurement engine 140 tracks a variety of metrics corresponding to the partitions implemented by flow control module 94. These metrics allow flow control module 94, as discussed in more detail below, to dynamically adjust bandwidth allocations across flows and partitions to improve or manage network application performance.

Administrator interface 150 facilitates the configuration of network traffic management device 130 to adjust or change operational and configuration parameters associated with the device. For example, administrator interface 150 allows administrators to configure a hierarchical partition configuration. Administrator interface 150 can provide a command line interface and/or a graphical user interface accessible, for example, through a conventional browser on client device 42.

A.1. Packet Processing

As discussed above, packet processor 92, in one implementation, is operative to detect new data flows, instantiate data structures associated with the flows and parse packets to identify packet attributes, such as source and destination addresses, port numbers, etc., and populate one or more fields in the data structures. The U.S. Patents and patent applications identified above discuss the operation of packet processors that can be incorporated into embodiments of the present invention. In one embodiment, when packet processor 92 encounters a new data flow it stores the source and destination IP addresses contained in the packet headers in host database 134. Packet processor 92 further constructs a control block (flow) object in flow database 135 including attributes characterizing a specific flow between two end systems, such as source and destination port numbers, etc. Other flow attributes in the flow object may include application specific attributes gleaned from layers above the TCP layer, such as codec identifiers for Voice over IP calls, Citrix database identifiers, and the like. Packet processor 92 also stores meta information relating to the received packets in a packet buffer—a memory space, typically in dynamic random access memory (DRAM), reserved for packets traversing network traffic management device 130. In one embodiment, the packets are stored in the packet buffer with a wrapper including various information fields, such as the time the packet was received, the packet flow direction (inbound or outbound), and a pointer to the flow object corresponding to the flow of which the packet is a part.

In typical network deployments, the majority of data flows are generally TCP or UDP flows. However, any suitable transport layer flow can be recognized and detected. As discussed more fully below, in one embodiment, flows are identified based on the following flow attributes: 1) source IP address, 2) destination IP address, 3) source port number, 4) destination port number, and 5) protocol (derived from the "protocol" field in IPv4 headers, and the "NextHeader" field in IPv6 headers). One skilled in the art will recognize that flows can be identified in relation to a variety of attributes and combinations of attributes. In addition, methods for determining new data flows and assigning packets to existing data flows are well known in the art and also depend on the particular transport layer protocol employed. For a TCP flow, for example, packet processor 92 can determine a new data flow by detecting SYN, SYN/ACK, and/or ACK packets. However, a new data flow, depending on the network protocol associated with the flow, can simply be a data flow for which there is no corresponding flow object. For example, with UDP and GRE flows (where there is no explicit connection or handshake mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the last packet and the time of the current packet is greater than the threshold, the current packet is deemed part of a new flow. In another implementation, a background and/or separate process can periodically compare the last packet times associated with a flow to a threshold period of time and deem the flow terminated if the last packet time is beyond the threshold period of time. The termination of TCP connections is typically detected by identifying FIN packets; however, the timeout mechanisms discussed above can be used in situations where a FIN packet is not detected.

In one embodiment, a control block (flow) object contains a flow specification object including such attributes as pointers to the client and server IP addresses in host database 134, as well as other flow specification parameters, such as port numbers, service type (see below), protocol type, ingress and egress network interfaces, and other parameters characterizing the data flow. In one embodiment, such parameters can include information gleaned from examination of data within layers 2 through 7 of the OSI reference model. U.S. Pat. No. 6,046,980 and U.S. Pat. No. 6,591,299, as well as others incorporated by reference herein, disclose classification of data flows for use in a packet-based communications environment. FIGS. 1 and 2 illustrate the concept associated with inside and outside addresses, where network interface 71 is the "inside" network interface and network interface 72 is the "outside" network interface. As discussed above, in one embodiment, a flow specification object includes an "inside" and "outside" address relative to network traffic management device 130. See FIG. 1. For a TCP/IP packet, packet processor 92 can compute the inside and outside addresses based on the source and destination network addresses of the packet and the direction of the packet flow. Still further, packet processor 92 can also identify which host is the client and which host is the server for a given data flow and store this information in the flow specification or flow object. The identification of a server or client in a given transaction generally depends on the network protocols employed by the hosts. For example, in TCP flows, a client initiates a transaction by transmitting a SYN packet to initiate a TCP connection. Network traffic management device 130 can detect the SYN packet and note the source network address of the packet as the client host, and the destination address as the server host. One of ordinary skill in the art will recognize how to identify clients and servers in connection with other networking protocols.

In one embodiment, packet processor 92 creates and stores flow objects corresponding to data flows in flow database 135. In one embodiment, flow object attributes include a pointer to a corresponding flow specification object, as well as other flow state parameters, such as TCP connection status, timing of last packets in the inbound and outbound directions, speed information, apparent round trip time, packet count, etc. Flow object attributes may further include service or traffic type identifiers, as well as policy parameters (such as partition identifiers). In one embodiment, flow objects further include a list of objects (such as partitions) for which measurement data (maintained by measurement engine 140) associated with the data flow should be logged. In one embodiment, to facilitate association of an existing flow object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding flow object. According to this embodiment, to identify whether a flow object exists for a given data flow, packet processor 92 hashes the values identified above and scans the hash table for a matching entry. If one exists, packet processor 92 associates the pointer to the corresponding flow object with the packets in the data flow.

A.2. Traffic Classification Engine

As discussed above, traffic classification engine 96, in one implementation, is operative to identify the types of network traffic (e.g., network applications) in the data flows. In addition, as discussed more fully below, traffic classification engine 96, in one implementation, can be configured to apply one or more policy actions to identify partition names corresponding to data flows. For example, a policy action can be applied to identify a partition for a flow based on one or more flow attributes, such as the source or destination IP address, service name, port numbers, and the like. In one implementation, a partition creation and deletion layer can operate on the partition names resulting from application of the policy actions to dynamically create partitions enforced by flow control module 94.

Traffic classification engine 96, in one implementation, comprises a plurality of service type identification modules, each of which correspond to a set of service types. Each service type identification module analyzes one or more packets in a given data flow to attempt to identify a service type corresponding to the flow. A service type, in one implementation, can be a network protocol, a service, or a network-application. For example, one service type identification module can correspond to a network application, such as Citrix®, while another service type identification module can be dedicated to detecting Oracle® or PostgreSQL database traffic. Still other service type identification modules can classify HTTP flows, FTP flows, ICMP flows, RTP flows, NNTP, SMTP, SSL, DCOM and the like. In one implementation, traffic classification engine 96 passes pointers to received packets to each service type identification module, which then inspect the packets stored in the buffer memory. In one implementation, each service type identification module has an associated packet count threshold (in the aggregate, packets from server to client, or client to server) after which it no longer attempts to classify a data flow. In one implementation, the packet count threshold will vary across the service type identification modules. For example, a service type identification module dedicated to classifying Citrix® traffic may be able to classify a data flow with certainty after three packets. In many instances, network traffic management device 130 may have to encounter more than one packet corresponding to a data flow in order to finally classify the data flow. For example, the initial TCP handshake packets may only reveal IP address, port numbers and protocol identifiers. While this information may be useful to identify HTTP traffic, for example, additional packets (such as data packets) may reveal a more specific network application, such as an accounting application or peer-to-peer file sharing application, that utilizes HTTP. Accordingly, in one implementation, each service type identification module responds to receiving a pointer to a packet by 1) reporting a matching service type identifier and the desire to inspect more packets in the flow (to possibly identify a more specific service type identifier); 2) reporting a matching service type and no interest in inspecting subsequent packets in the flow; 3) reporting no matching service type identifier and the desire to inspect more packets in the flow; and 4) reporting no matching service type and no interest in inspecting subsequent packets in the flow.

To allow for identification of service types (e.g., FTP, HTTP, etc.), some of the service identification modules of traffic classification engine 96, in one embodiment, are supported by one to a plurality of service identification tables in a relational database that allow for identification of a particular service type (e.g., application, protocol, etc.) based on the attributes of a particular data flow. Of course, other suitable data structures can be used to support the identification of service types, such as a set of hard-coded instructions, an XML file, and the like. In one embodiment, a services table including the following fields: 1) service name, 2) service aggregate (if any), 3) name of service, and 4) service attributes (e.g., port number, outside IP address, etc. A service aggregate encompasses a combination of individual services (each including different matching criteria, such as different port numbers, etc.) corresponding to the service aggregate. When network traffic management device 130 encounters a new flow, the service type identification modules of traffic classification engine 96 analyze the data flow against the service attributes in their respective services tables to identify a service name corresponding to the flow. In one embodiment, traffic classification engine 96 may identify more than one service name associated with the flow. In this instance, traffic classification engine 96 associates the more/most specific service name to the flow. For example, network traffic associated with a peer-to-peer file sharing service may be identified according to a network protocol, such as TCP or HTTP traffic, as well as higher level, application-specific traffic types such as the actual file sharing application itself (e.g., Napster, Morpheus, etc.). In this instance, traffic classification engine 96 associates the flow with the most specific service name. As a further example, an FTP application data flow can be further classified to FTP command or FTP data flows. In one implementation, traffic classification engine 96 writes the identified service name (or other identifier) into the control block (flow) object corresponding to the data flow. As discussed herein, service type identification, in one implementation, may be a preliminary operation to the identification of a partition for a given data flow.

A.3. Flow Control Module

As discussed more fully below, flow control module 94 enforces aggregate, partition-based bandwidth utilization controls on data flows traversing access link 21. As discussed above, a partition is essentially a division or allocation of the capacity of access link 21 or a network interface on network traffic management device 130. In other words, a partition operates to allocate bandwidth to data flows on an aggregate basis. For example, a partition can be configured to guarantee a minimum amount of bandwidth, and/or place a maximum or limit on available bandwidth, to network traffic flows that fall within that partition. Still further, other partitions can be configured with weight values, where the relative weight values across sibling partitions influence bandwidth allocation. U.S. application Ser. No. 11/053,596 discloses how weighting values may be used to allocate bandwidth to partitions. In one implementation, flow control module 94 implements the deterministic partition scheduling functionality disclosed in U.S. application Ser. No. 10/108,085, incorporated by reference herein. However, any suitable algorithms and processes can be used for enforcing partitions. Flow control module 94 can use any suitable functionality to enforce bandwidth controls known in the art, including, but not limited to class-based weighted fair queuing, Committed Access Rate (CAR) and "leaky bucket" techniques.

Partitions can be arranged in a hierarchy—that is, partitions can contain partitions. For example, the bandwidth, or a portion of the bandwidth, available under a parent partition can be allocated among multiple child partitions. In one embodiment, at the highest level, a partition exists for all available outbound bandwidth (i.e., root outbound partition), while another partition exists for all available inbound bandwidth (i.e., root inbound partition) across the particular access link. These partitions are then sub-dividable to form a hierarchical tree. For example, an enterprise employing static partitions may define a static partition for a PeopleSoft software application, and sub-divide this parent partition into a large burstable child partition for its human resources department and a smaller burstable child partition for the accounting department.

In addition, flow control module 94, in some implementations, can optionally apply per-flow policies on data flows traversing access link 21. However, as discussed in more detail below, configuration and implementation of per-flow rate policies occurs in connection with a corresponding partition. Per-flow policies may include minimum and maximum bandwidth limits applied on a per-flow basis within a given partition. In one implementation, flow control module 94 includes a partitioning module operative to enforce aggregate bandwidth utilization controls (e.g., partitions), and a per-flow rate control module operative to apply per-flow rate controls on data flows. In addition, in one implementation, flow control module 94 implements the TCP Rate Control technologies disclosed in U.S. Pat. No. 6,038,216 to control the rate at which transmitters send data and therefore the amount of data that is queued in buffers at network traffic management device 130.

A.3.a. Overall Packet Processing Flow

FIG. 6 provides, for didactic purposes, an exemplary hierarchical partition configuration for purposes of illustrating the overall output scheduling functions of network traffic management device 130. Root partition node 82 represents the total capacity of access link 21 in either the outbound or inbound direction. In one implementation, separate data structures and processes are maintained for the outbound and inbound directions. Partition nodes 83 represent a first set of partitions allocating the capacity of access link at a first level. As FIG. 6 shows, each parent partition may include child partitions represented as partition nodes 83 and 84. For didactic purposes, assume that access link 21 is a T1 line and, thus, provides maximum available bandwidth of 1.5 Mbps. Partitions P1, P2, and P3 may be configured to equally divide access link 21 into 0.5 Mbps partitions at a first level. In addition, child partitions P4 and P5 may further divide parent partition P1 into a 0.2 Mbps partition (P4) and a 0.3 Mbps partition (P5). Similarly, child partitions P6, P7 and P8 may divide parent partition P2 into two 0.1 Mbps partitions (P6 and P8), and a 0.3 Mbps partition (P7). Still further, other configurations are possible. For example, the root node may represent the access link in both the inbound and outbound direction, while child partitions from the root can correspond to traffic encountered at a given network interface (such as interface 71) and destined for egress from a second network interface (such as interface 72). FIG. 5 illustrates the overall process flow associated with an output scheduling process according to an embodiment of the present invention. In one implementation, flow control module 94 implements a modified form of the deterministic output scheduling process disclosed in U.S. application Ser. No. 10/108,085. Specifically, partition queues corresponding only to leaf partitions are created. Accordingly, while parent partitions are selected as part of the output scheduling process, packets are scheduled only from leaf partitions queues. In addition, all packets, for output scheduling, fall into a leaf node. Still further, as FIG. 5 illustrates, each partition, in one implementation, includes a low priority partition queue 60*a* and a high priority partition queue 60 which facilitates certain per-flow rate management tasks, as discussed more fully below. Still further, both the low priority and high priority partition queues 60*a*, 60*b* store pointers to flow queues that buffer packets on a per-flow basis, as discussed more fully below. Of course, other implementations are possible. For example, the use of high priority and low priority partition queues can be eliminated. In addition, the use of flow queues can also be eliminated, causing packet pointers to be buffered in partition queues, as disclosed in U.S. application Ser. No. 10/108,085.

Otherwise, the deterministic output scheduling functionality disclosed in U.S. application Ser. No. 10/108,085 is generally implemented. For example, network traffic management device 130 processes packets traversing it to identify corresponding partitions associated with the packets (see FIG. 5, #55). Network traffic management device 130 then enqueues the packets or pointers to the packets onto corresponding partition queues 60*a*, 60*b*. In one embodiment, if the partition associated with the packets was previously inactive, the packet processing process 55 also updates output scheduling data structure 75 to add a corresponding partition identifier, as discussed in U.S. application Ser. No. 10/108,085, to allow for scheduling of the packets for output. Still further, additional partition queues can be dynamically created in response to traffic flows that fall into dynamic partitions (see below). As FIG. 5 illustrates, an output scheduling process 70 operates on output scheduling data structure 75 to select partitions, de-queue flow queues off respective partition queues, de-queue packets off flow queues, and enqueue the packets on output queue 80, according to the methods described herein. As discussed below, flow queues are re-inserted into a partition queue if they contain additional packets. Another process associated with network traffic management device 130 releases the packets from output queue 80 and performs other processes such as logging of data associated with measurement engine 140.

FIG. 3 illustrates the overall process flow, according to one implementation of the present invention, directed to the operation of network traffic management devices 130. In one embodiment, packet processor 92 receives a data packet (FIG. 3, 202) and determines whether flow database 135 contains an existing flow object corresponding to the data flow (204) (see Section A.1., supra). If no flow object corresponds to the data packet, packet processor 92 constructs a flow object including attributes characterizing the data flow, such as source address, destination address, etc. (206) (see above). In one embodiment, packet processor 92 analyzes the source and destination IP addresses in the packet header and scans host database 134 for matching entries. If no matching entries exist, packet processor 92 creates new entries for the source and destination IP addresses. As discussed above, in one embodiment, a flow object contains a flow specification object including such attributes as pointers to the client and server IP addresses in host database 134, as well as other flow specification parameters, such as TCP port numbers, protocol type, pointers to variable-length information in a dynamic memory pool, ingress and egress network interface identifiers, and other parameters characterizing the data flow. In addition, packet processor 92 also computes an estimated initial data rate for the flow (207). In one implementation, packet processor 92 uses the rapid data rate detection technologies disclosed in U.S. Pat. No. 5,802,106 to provide an initial estimate of the data rate for the flow. In one implementation, the estimated data rate is stored in a field of the flow object. In one implementation, this initial rate estimate is replaced, as more packets in the flow traverse network traffic management device 130, by a current rate based on weighted moving average over an analysis interval.

As FIG. 3 illustrates, packet processor 92 updates, for existing data flows, attributes of the flow object in response to the packet such as the packet count, last packet time, and the like (208). Packet processor 92 can also perform other operations, such as analyzing the packets for connection state information. For example, packet processor 92 can inspect various TCP flags to determine whether the received packet is part of a new data flow or represents a change to an existing data flow (such as the first data packet after the TCP handshake). Methods for determining new data flows and assigning packets to existing data flows are well known in the art and also depend on the particular transport layer protocol employed. For a TCP packet, packet processor 92 can determine a new data flow by detecting SYN and/or SYN/ACK packets. However, a new data flow can simply be a data flow for which there is no corresponding flow object in flow database 135. In addition, with UDP and GRE flows (where there is no explicit connection mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the latest packet and the time of the last packet is greater than the threshold, the new packet is deemed part of a new flow. In another embodiment, a separate process monitors the last packet times associated with UDP, GRE and similar flow types to detect termination of a given flow. In one implementation, this separate process can also be passed pointers to TCP FIN packets to adjust various data structures, such as reallocating flow object space to a pool of available memory, adjusting flow counts in partition objects.

As FIG. 3 illustrates, packet processor 92 then passes a pointer to the packet, in one implementation, to traffic classification engine 96, which operates as discussed above to classify the data flow (214). Lastly, the packet is passed to flow control module 94 (218), which performs flow control operations on the data packets, as described in more detail below. For example, flow control module 94 identifies the appropriate partition to which the packet belongs, and applies the partition and per-flow policies to the packet. As FIG. 3 illustrates, network traffic management device 130 may also perform other operations in response to arrival of the packet. For example, measurement engine 140 may record certain measurement variables on an aggregate or per-partition basis (218). For example, measurement engine 140 may include one or more partition objects that maintain statistics or other parameters used by flow control module 94 to dynamically adjust aggregate and per-flow bandwidth allocations. For example, each partition object, in one implementation, may include the following statistics: 1) a flow count (the number of currently active flows); 2) current rate (a weighted moving average in bps of the rate observed for the flows in the class); 3) aggregate compensation demand; and 4) aggregate unutilized fair share. In addition, per-flow statistics are also maintained, such as the current rate of the flow (a weighted moving average over an analysis interval of the rate at which packets are transmitted from network traffic management device), packet count, and the like. One skilled in the art will recognize that the order of processing operations illustrated in FIG. 3 is one possible process flow and that the flow control processes described herein can be performed at other points in the packet processing path.

A.3.b. Reading Packets onto Flow and Partition Queues

FIG. 4A illustrates a process, according to one implementation of the invention, directed to reading packets onto flow and partition queues. In one implementation, when flow control module 94 receives a packet pointer (302) and identifies a partition corresponding to the packet (304), it determines whether the output scheduling data structure 75 contains the identified partition (306). If not, flow control module 94 instantiates the partition in the output scheduling data structure 75, as disclosed in U.S. application Ser. No. 10/108,085 (308). As discussed therein, flow control module 94 may add the identified partition and any parent partition identifiers, if required. If the output scheduling data structure 75 contains the identified partition, flow control module 94 then determines whether a flow queue exists for the flow corresponding to the received packet (310). If a flow queue exists, flow control module 94 enqueues the received packet pointer onto the corresponding flow queue (314). If a flow queue does not exist, however, flow control module 94 creates a flow queue and enqueues the packet pointer onto the flow queue (312). In addition, since the packet represents the addition of a new flow to a partition, flow control module 94 re-computes the per-flow bandwidth allocations for the current flows in the partition (316). For example, U.S. application Ser. No. 11/053,596 discloses methods for allocating bandwidth to flows on a fair share basis. In addition, per-flow rate policies applied to a given partition can also affect the bandwidth allocated to the flows. Flow control module 94 then determines whether to enqueue the flow queue onto the high priority (60b) or low priority (60a) partition queue corresponding to the identified partition. In one implementation, if the initial flow rate of the flow is less than the per-flow fair share for the partition (318), flow control module 94 enqueues the flow queue onto the high priority queue (322), facilitating the chance for the rate of the flow to increase. Otherwise, flow control module 94 enqueues the flow queue onto the low priority queue 60a corresponding to the identified partition (320). In one implementation, flow control module 94 applies a process directed to the per-flow rate enforcement. In one implementation, the per-flow target rate is enforced by mapping the target rate to an advertised TCP window size, as disclosed in U.S. Pat. No. 6,038,216, and modifying the advertised window size in the TCP ACK fields of packets transmitted back to the transmitter to modify the rate at which subsequent packets are sent. Of course, the per-flow rate control processes may be applied to the packets at any point prior to egress from network traffic management device 130. However, the use of TCP Rate Control technologies to control the rate of data transmission from end hosts is an optional feature.

A.3.e. Scheduling Packets onto Output Queue

FIGS. 4B and 4C, together, illustrate a method, according to one implementation of the invention, directed to scheduling packets on the output queue and enqueuing flow queues onto the appropriate partition queue. As discussed above and as illustrated in U.S. application Ser. No. 10/108,085, a process associated with flow control module 94 operates to select partitions for output. As FIG. 4B illustrates, flow queues in the high priority partition queue 60b corresponding to the selected partition are serviced before flow queues in the low priority partition queue 60a (see 350, 351, 352). In one implementation, the first flow queue in the low/high priority partition queue is de-queued from the queue (354). Flow control module 94 then de-queues the first packet in the flow queue (356) and enqueues the packet onto the output queue 80 (358). If there are no more packets in the flow queue (360), flow control module 94 deletes the flow queue (362). Otherwise, flow control module 94, in one implementation, determines whether to enqueue the flow queue onto the low or high priority partition queue based on the current rate of the flow. As FIG. 4B illustrates, flow control module 94 determines the priority of the flow queue (364) by comparing the current rate of the flow to the per-flow fair share bandwidth allocation for the partition (FIG. 4C, 370, 372, 374). If the current rate of the flow is greater than the per-flow fair share bandwidth allocation, the flow queue is enqueued onto the low priority queue (372, 366); otherwise, flow control module 94 enqueues the flow queue onto the high priority queue (374, 366). As discussed in U.S. application Ser. No. 10/108,085, flow control module 94 updates the time stamp of the partition in the output scheduling data structure 75 based on the aggregate bandwidth allocation corresponding to the partition (368).

A.4. Partition Configurations

The following describes various implementations of network traffic management device 130 directed to partition configuration and creation mechanisms that facilitate network bandwidth allocation and management.

A.4.a. Weighted and Constrained Partitions

As discussed above, prior art network traffic management systems allowed users to configure weighted partitions to allocate bandwidth, and per-flow rate policies, such as minimum rate guarantees. Certain configurations, if unconstrained, can lead to unintended consequences, and can lead to conflicts between guaranteed per-flow rates and partition weight assignments. For example, assume for didactic purposes the following partition configuration:

Stooges: size(100 Kbps, 100 Kbps)
   . . . Moe: weight(5)
   . . . Curly: weight(20)

Further assume that 9 VoIP flows having a guaranteed rate policy (in this example, of type "rate(10 Kbps, 10 Kbps)") fall into partition Moe, while various web browsing flows having no guaranteed or required bandwidth (e.g., rate(0 Kbps,0 Kbps)) fall into partition Curly. As discussed in U.S. application Ser. No. 11/053,596, the weight values can be used to allocate bandwidth corresponding to the parent Stooges partition between partitions Moe and Curly. However, even though the user has configured weights for Moe/Curly to be 5/20, the VoIP to web traffic allocation ratio will be 90/10, given the minimum guaranteed rates for VoIP flows.

The implementation described below provides a mechanism addressing this potential conflict. In one implementation, network traffic management device 30 supports three partition types:

1) Parent Partitions. Parent partitions are non-leaf partition nodes in a partition hierarchy. Parent partitions can be configured with minimum and maximum sizes (e.g., 0, unbounded). According to one implementation, a given parent partition may not be configured with both weight and constraint partitions as direct child partitions.

2) Weight Partitions. Weight partitions are leaf-node partitions that have relative weights among siblings (i.e., direct descendents of the same parent partition), but no size attributes (such as guaranteed minimum and/or maximum rates).

3) Constraint Partitions. Constraint partitions are leaf-node partitions that can be configured with one or more constraints, such an (min, max) aggregate size, as well as constraints for each flow that falls into a given constraint partition, such as a guaranteed per-flow (min, max) rate (again may be (0, unbounded). In addition, constraint partitions may also be configured with a limit on the number of data flows allowed in a given partition (i.e., count(max), see below). Constraint partitions are appropriate to certain network traffic types, such as VoIP traffic, where the data flows have consistent behaviors and/or QoS requirements that should be observed. The following table summarizes the three partition types discussed above, and their configurable attributes.

| Partition Type | Attributes |
|---|---|
| P | Parent, size(min, max) |
| W | Leaf, weight |
| C | Leaf, partition(min, max), count(max), flow(min, max) |

In one implementation, a configuration interface (here, administrator interface 150) enforces the foregoing restrictions. For example, the configuration interface does not allow a user to configure a constraint partition as a direct descendant of a parent partition that has an existing child weight partition, and vice versa. In one implementation, the configuration interface displays a warning dialogue box explaining the constraining rule the attempted configuration violates. In addition, the configuration interface does not support the configuration of per-flow rate policies separate from the constraint partitions. That is, any per-flow rate parameters get inherited by the fact that a given data flow was assigned to a constraint partition with assigned "flow(min, max)" values. Accordingly, since a "guaranteed rate" flow cannot be placed into a Weight partition, and a Weight partition and its siblings have no (min, max) constraints, the user-specified weight ratios can actually be realized.

A.4.b. Weight Group Partitions

While the foregoing implementation addresses the conflict that can arise from per-flow rate guarantees and partition weights, a problem can arise when a user creates a large number of sibling weight partitions under a given parent partition. Still further, the foregoing embodiment does not address the interaction of per-flow weights and partition weights. For example, assume for didactic purposes that two data flows—an NNTP flow with a configured per-flow weight of 3 that falls into a partition of weight 70, and a Citrix flow with a configured per-flow weight of 25 that falls into a sibling partition of weight 15. Computing the relative data rates for the two flows can be problematic, often leading to unpredictable results or to results that may be unexpected by the user. To address the foregoing, in the implementation described below, network traffic management device 30 employs a predetermined set of partition types, and weight groups that are operative to dynamically group flows that fall within certain partition types. As discussed below, the elimination of per-flow weights in favor of Weight Groups addresses the problem caused by interaction of per-flow weights and partition weights.

In this implementation, Weight partitions (see above) are replaced with a new partition type (L or Weight Group Partitions), as set forth in the table below. In addition, constraint partitions and weight group partitions may not share the same parent partition.

Partition

| Type | Attributes |
|---|---|
| P | Parent, size(min, max) |
| C | Leaf, partition(min, max), count(max), flow(min, max) |
| L | Leaf, partition(min, max) |

Replacing weight (W) partitions and per-flow weight policies, a Weight Group is assigned to each data flow by a policy action. In one implementation, traffic classification engine is operative to implement policy actions to assign the appropriate partition and weight group to a given data flow. The following defines a set of policy actions according to one embodiment of the invention:

```
if(service is SMTP)
    policy weight = 40, weight-group = E-Mail
if(service is POP3)
    policy weight = 40, weight-group = E-Mail
if(service is NNTP)
    policy weight = 3, weight-group = Bulk
if(service is FTP)
    policy weight = 40, weight-group = FileTransfer
``` or

```
if(service is SMTP)
    policy weight = 40email
if(service is POP3)
    policy weight = 40email
if(service is NNTP)
    policy weight = 3bulk
if(service is FTP)
    policy weight = 40filetransfer
``` or

```
assign weight E-Mail
    value = 40
assign weight Bulk
    value = 3
assign weight FileTransfer
    value = 40
if(service is SMTP)
    policy weight = E-Mail
if(service is POP3)
    policy weight = E-Mail
if(service is NNTP)
    policy weight = Bulk
if(service is FTP)
    policy weight = FileTransfer
```

When a data flow lands in a type L or weight group partition, it is dynamically grouped with all other flows in the same partition belonging to the same Weight Group. The Weight Group is ignored for any flows landing in a type C or constraint partition. In effect a sub-partition of the aggregation partition is "dynamically" created with the implicit name of the Weight Group and having the assigned weight. U.S. application Ser. No. 09/966,538 discloses configuration and use of dynamic partitions. To illustrate the foregoing, assume for didactic purposes a type L partition called Stuff of size(100, 500), to which a user assigned all four of the flow types (above). According to this example, SMTP and POP3 flows would end up in a dynamically created "Stuff/E-Mail" partition, NNTP in a "Stuff/Bulk" partition, and FTP in the "Stuff/FileTransfer". Note that though both "Stuff/E-Mail" and "Stuff/FTP" have the same weight, they are separate sub-partitions (called for didactic purposes type A or aggregation partitions).

Similar to the advantages achieved by the user of dynamic partitions disclosed in U.S. application Ser. No. 09/966,538, the implementation set forth above eliminates the need to configure a large number of service or network application-specific partitions for each network device. Rather, the sub-partitions of the aggregation partitions are created dynamically when needed (and deleted when no longer needed) based on the data flows matching a given weight group.

A.4.c. Dynamic Partition Sub-Hierarchy

In another implementation, the network traffic management device 30 allows for the dynamic creation of a partition sub-hierarchy in response to detected network traffic. Network traffic management device 30 may often be deployed at a point in a network environment where it encounters traffic from multiple sites (such as ISP customer sites, or branch offices of an enterprise) each requiring a bandwidth utilization control scheme (here, a partition sub-hierarchy). As discussed in the above-identified patent applications, it is possible to differentiate these sites, and classify the network traffic associated with them, based on corresponding subnet addresses. In some implementations, the network traffic classification operations implemented on network traffic management device 30 are kernel-level operations. In one implementation, network traffic management device operates on a compiled (or otherwise optimized) representation of a general-purpose XML configuration to increase the speed of classification and data throughput. Still further, when adding or deleting a site from the configuration of network traffic management device 30, the XML configuration (and thus the compiled/optimized version) must be changed. However, having to frequently change the general-purpose XML configuration that is pushed into the kernel is not very desirable, as the process could require much overhead to rebuild kernel data structures. Furthermore, even though adding and deleting sites is likely to be a common operation, changing the general policies that apply to them is often less common.

For didactic purposes, assume that an Internet Service Provider (ISP) maintains two service levels (Pewter & Tin) and corresponding customer lists, including the following customers:

Customer List: Pewter

| Subnet | Customer |
|---|---|
| 5.6.7.0/24 | Enwrong |
| 5.7.0.0/16 | Enwrong |
| 2.1.0.0/16 | Sentricom |
| 2.9.5.0/24 | Sentricom |

Customer List: Tin

| Subnet | Customer |
|---|---|
| 9.3.7.0/24 | WorldCo |
| 9.8.0.0/16 | WorldCo |
| 6.2.0.0/16 | Website |

In one implementation, the customer lists are available to the classification engine 96 operating on the packet path executed on network traffic management device 30. Furthermore, to allow for the dynamic creation of partition sub-hierarchies, network traffic management device 30 supports dynamic (Type D) partitions from which other partitions may depend, as described in more detail below. The following table sets forth the various partition types, according to one implementation of the invention, supported by network traffic management device 30 and describes the partition-dependency constraints associated with each partition type.

| PT | Parent | Siblings | Attributes |
|---|---|---|---|
| R | ⁃ | ⁃ | size(fixed) |
| P | R, P | P, C, D, L | size(min, max) |
| D | R, P | P, C, D, L | partition(min, max), cap(max), dynamic(name("Customer")) user(min, max)) |
| U | D* | U | user(min, max) |

-continued

| PT | Parent | Siblings | Attributes |
|---|---|---|---|
| O | D | C, L | partition(min, max) |
| C | R, P, D+ | P, C, D, L | partition(min, max), count(max), flow(min, max) |
| L | R, P, D+ | P, C, D, L | partition(min, max), dynamic(name("WeightGroup"), weight("Weight")) |
| A | L* | A | weight |

The Root (Type R) partition represents the root of the bandwidth, such as the total bandwidth available on an access link. Dynamic (Type D) partitions are "dynamic partitions" with an optional cap (maximum number of dynamic user (U) children) and configured size for each dynamic child. Overflow (type O) partitions are "overflow" partitions. When no resources exist (or the user partition cap is reached) for a dynamic partition, the network traffic falls into an overflow partition. As the foregoing table illustrates, network traffic management device 30, in one implementation, also supports constraint (Type C) partitions, weighted group (Type L) partitions, and aggregation (Type A) partitions, as set forth above.

In this implementation, network traffic management device 30 supports two dynamic partition types—Type U for users (e.g., "customers" or "branches", etc.) and Type A for weight groups—that are dynamically created and deleted as necessary. When the partition configuration specifies a child partition under a type D node, the generated type U partition is imposed between the type D and (a copy of) the child. This is indicated by "D+" above for partition types C and L.

In addition, network traffic management device 30 can be configured with a rule that references the customer list object to identify an appropriate dynamic (D) partition. For example, given the partition hierarchy illustrated in FIG. 7A the following policy action or rule can be configured.

```
if(Pewter.Contains(DestinationIPAddress))
    policy partition =
    /Root/Users/Pewter.Customer(DestinationIPAddress)
```

Accordingly, by creating a partition configuration hierarchy under the Pewter.Customer dynamic partition, the same partition scheme can be dynamically created for each customer. FIG. 7B illustrates the partition scheme that is dynamically created when network traffic associated with "WorldCo" is encountered. If network traffic from Website were also encountered, a separate user partition and partition sub-hierarchy would also be created. In addition, flow control module 94 manages the partition sub-hierarchies in a manner similar to the dynamic partitions disclosed in U.S. application Ser. No. 09/966,538, such as deleting an inactive, or least recently-used, partition sub-hierarchy in response to a new data flows.

A.4.d. Partition Patterns

In one implementation, network traffic management device 130 also includes a Partition Creation and Deletion (CaD) Layer above the flow control module 94 which is operative to create and destroy partitions on demand. All the configuration parameters, such as users, weight groups and the like, are handled by the CaD layer, as described in more detail below. In addition, to achieve the same or similar configuration scheme as described in Section A.4.c, above, the Pewter and Tin dynamic partitions can be incorporated into the customer list information accessible to the CaD layer. For example, the CustomerList table can be expanded, as a SQL table, with a ServicePurchased column. In addition, the subnets corresponding to each customer can be separated into another SiteList table, as set forth below.

Table CustomerList:

| CustomerName | ServicePurchased | SiteName |
|---|---|---|
| Enwrong | Pewter | Houston |
| Sentricom | Pewter | Milpitas |
| Website | Tin | Houston |
| Website | Tin | Sunnyvale |
| Enwrong | Tin | Dallas |

Table SiteList:

| Subnet | CustomerName | SiteName |
|---|---|---|
| 5.6.7.0/24 | Enwrong | Houston |
| 5.7.0.0/16 | Enwrong | Dallas |
| 2.1.0.0/16 | Sentricom | Milpitas |
| 2.9.5.0/24 | Sentricom | Milpitas |
| 9.3.7.0/24 | WorldCo | Houston |
| 9.8.0.0/16 | WorldCo | Houston |
| 6.2.0.0/16 | Website | Sunnyvale |

Table ServiceWeightings:

| ServiceName | WeightGroup |
|---|---|
| SMTP | E-Mail |
| POP3 | E-Mail |
| NNTP | Bulk |
| FTP | FileTransfer |

Table Weightings

| WeightGroup | Weight |
|---|---|
| E-Mail | 40 |
| Bulk | 3 |
| FileTransfer | 40 |

FIG. 8 illustrates a process flow for dynamically creating a partition hierarchy according to one implementation of the present invention. In one implementation, the process flow illustrated in FIG. 8 is applied on a per-flow basis to dynamically create partitions in response to data flows traversing network traffic management device 130. Traffic classification engine 96 can also be configured with classification rules such as

```
select CustomerName, SiteName from SiteList join IPHeader
    where [DestinationAddress] <<= Subnet
    select ServicePurchased from CustomerList
        using [CustomerName], [SiteName]
    select WeightGroup from ServiceWeightings
        using [ServiceName]
    select Weight from Weightings
        using [WeightGroup]
```

As FIG. 8 shows, in one implementation, traffic classification engine 96 applies the classification rules above to identify the customer name and other attributes relevant to identifying a partition for a new data flow (502). The SQL databases for the CustomerList and SiteList tables, in one implementation, can store the data for all customers, branches or other sites (e.g. across all network traffic management devices 130 managed by a given entity, such as an ISP, a corporation, a university, etc.). By having another column (e.g., ServingLocation) in the Sitelist table, which would contain the UnitName of a network traffic management device 130, a user level process executing on each network device can then extract, using SQL queries, the information relevant to itself before pushing data into the kernel. The packet path traffic classification process would have the ability to do simple lookups (as set forth above) on pre-digested and optimized data (e.g., stored in hash tables, etc.) fed to it by the user-level process.

After applying the classification rules (above), the CaD layer applies a policy action to the flow, such as:

```
policy partition
/Inbound/[ServicePurchased]/[CustomerName]/[SiteName]/LatencyInsensitive/[WeightGroup([Weight])]
```

In one implementation, the CaD layer substitutes the Policy variables for the current flow (the names in brackets) to get "/Inbound/Pewter/Enwrong/Houston/LatencyInsensitive/E-Mail(30)" (FIG. 8, 504). In one implementation, the symbol "$1" in the partition pattern indicates a substitution variable whose value is replaced by the results of an applied policy action. The CaD layer then looks for an existing partition maintained by flow control module 94 that matches the identified partition name "/Inbound/Pewter/Enwrong/Houston/LatencyInsensitive/E-Mail" (506). If the CaD layer does not find the partition, it accesses a partition pattern configured for network traffic management device 130 to determine how to create the appropriate partition for the data flow (508). The following provides a portion of a partition pattern according to one possible implementation of the present invention.

```
/Inbound                size(10M, 10M)
    /Pewter             size(2M, 7M)
        /*
            /*                          cap(7) size(1M, 1.5M)
                /VoIP                   size(50K, 100K)
                    /G.711u             flow(64K, 64K)
                    /GSM                flow(8K, 8K) limit(5)
                    /*                  flow($1, $1)
                /LatencyInsensitive     size(200K, 1.45M)
                    /*                  weight($1)
                /Pest                   size(0, 70K)
        /**                             size(0, 100K)
```

As one skilled in the art will recognize, a complete partition pattern according to the didactic example above would include patterns for outbound traffic, as well as the "Tin" network traffic flows. Furthermore, the policy actions (and the resulting partition names) should be configured to match the hierarchical configuration of a corresponding partition pattern in order to allow the CaD layer to properly create a partition. When scanning the ParPat, the CaD layer, in one implementation, either matches a partition node exactly or it will match a creation or '*' entry. Given the nature of the creation entry, there is generally only one creation entry at a given level in the partition pattern hierarchy, and it is generally the last entry at a given level of the hierarchy. When the CaD layer hits a creation ('*') entry, it creates a new partition node with the listed partition attributes at the corresponding point in the partition hierarchy with the name resulting from the application of the policy action. Accordingly, in the didactic example above, the CaD layer creates the following partition configuration.

```
/Inbound            size(10M, 10M)
    /Pewter         size(2M, 7M)
        /Enwrong
            /Houston    size(1M, 1.5M)
                /LatencyInsensitive     size(200K, 1.45M)
                    /E-Mail             weight(30)
```

In one implementation, the configurable partition attributes include:

| | |
|---|---|
| size(min, max) | partition size |
| flow(min, max) | per-flow rate constraint for all flows in the partition |
| limit(max) | limit of maximum individual flows allowed in the partition |
| weight(value) and | partition weight |
| cap(max) | maximum dynamic partition children to create |

The CaD layer uses the cap(max) parameter to cap the number of dynamic child partitions to create (as disclosed in U.S. application Ser. No. 09/966,538). In one implementation, if the cap has been reached (or the device is otherwise out of resources, or a flow limit for a partition has been reached), the flow will be placed in the '' partition if there is one (analogous to the "Overflow" partitions disclosed in U.S. application Ser. No. 09/966,538). If not, this CaD layer assigns no partition—it, in one implementation, is assigned using a general policy defaulting mechanism. In one implementation, the application of a policy action can result in a true or false value that indicates the success or failure in connection with identifying and assigning a partition to a given data flow. If false is returned, a general policy defaulting mechanism can be applied to the flow to identify and execute a policy, such as a discard policy, a redirection policy, and the like. Furthermore, given the nature of the default () entry, a partition pattern typically contains a single or no default (**) entries among sibling partitions.

To further illustrate operation of partition parameters, assume the following policy action applied to VoIP flows:

```
policy partition
/Inbound/[ServicePurchased]/[CustomerName]/[SiteName]/VoIP/[AppnessAttribute("Codec")]
```

The foregoing policy action could cause the CaD Layer, based on the foregoing partition pattern, to create the following partition (if it did not already exist):

```
/Inbound        size(10M, 10M)
    /Pewter     size(2M, 7M)
```

```
/Sentricom
    /Milpitas          size(1M, 1.5M)
        /VoIP          size(50K, 100K)
            /GSM       flow(8K, 8K) limit(5)
```

In one implementation, AppnessAttribute corresponds to an attribute of the data flow gleaned from one or more layers of the OSI reference model (such as codec identifiers, Citrix database names, web MIME types, etc.), as discussed in the above-identified patents and patent applications.

Still further, the CaD layer further includes rules that choose which policy action(s) to apply to a given data flow. In one implementation, the CaD layer chooses one or more policy actions to apply to a flow based on one or more data flow attributes. For example, one policy action may be appropriate for VoIP flows. In one implementation, a rule can be configured to apply a VoIP policy action to data flows that match a VoIP service identifier. Accordingly, a rule can be attached to different policy actions to control which policy actions are applied to different data flows.

In one implementation, network traffic management device 130, at start up and before any network traffic is encountered, maintains no partitions. Rather, all partitions are dynamically created according to a partition pattern by the CaD layer in response to data flows. For example, if the first flow encountered by network traffic management device 130 is an SMTP flow, the CaD Layer may create the following partitions (6 partitions, one leaf):

```
/Inbound          root size(10M, 10M)
    /Pewter       size(2M, 7M)
        /Enwrong
            /Houston          size(1M, 1.5M)
                /LatencyInsensitive    size(200K, 1.45M)
                    /E-Mail    weight(30)
```

In one implementation, the CAD layer, using the following policy action and partition pattern, creates partitions at the root level based on the network interface at which traffic was encountered (SourceInterfaceName).

policy partition/Incoming/[SourceInterfaceName([InterfaceBandwidth])]/LatencyInsensitive/[WeightGroup ([Weight])]
Partition Pattern:

```
/Incoming
    /*          root size($1, $1)
        /LatencyInsensitive    size(10%, 90%)
            /*         weight($1)
        /Pest          size(0, 3%)
        /**            size(0, 7%)
```

The first SMTP packet or data flow, for example, would cause the CaD layer to create the following partitions:

```
/Incoming
    /Upper_Outside         root size(10M, 10M)
        /LatencyInsensitive    size(1M, 9M)
            /E-Mail   weight(30)
```

The Policy variable InterfaceBandwidth, in one implementation, can come from a SQL table such as:

| UnitName | InterfaceName | InterfaceBandwidth |
|---|---|---|
| homer | Upper_Outside | 10M |
| homer | Lower_Outside | 7M |
| lisa | eth1 | 100M |
| lisa | eth2 | 50M |

The Partition CaD mechanism is not limited to creating per-user type partitions. For example, the following policy action and partition pattern would place Citrix flows into separate partitions by database name. The databases named "accounting" and "marketing" get partitions with weights of 50 and 30, respectively. Any other databases used get their own partitions with a weight of 10.

policy partition/Inbound/Citrix/[AppnessAttribute("DatabaseName")]
Partition Pattern:

```
/Inbound          size(10M, 10M)
    /Citrix       size(1M, 5M)
        /accounting    weight(50)
        /marketing     weight(30)
        /*             weight(10)
    /**           size(0, 100K)
```

Still further, a dynamic user partition, similar to that described in U.S. application Ser. No. 09/966,538, can be configured with the following policy action and partition pattern.

policy partition/Inbound/Users/[DestinationAddress]
Partition Pattern:

```
/Inbound       size(10M, 10M)
    /Users     size(9M, 9M)
        /*         cap(500) size(0, 100K)
        /**        size(0, 100K)
    /**        size(0, 1M)
```

In one implementation, the partition attributes have been extended to include a limit on the number of data flows that are allowed in a partition.

| | |
|---|---|
| root | this partition is a root of a bandwidth pool |
| size(min, max) | partition size |
| flow(min, max) | per-flow rate constraint for all flows in the partition |
| limit(max) | limit of maximum individual flows allowed in the partition |
| weight(value) | partition weight |
| cap(max) | maximum dynamic partition children to create |

The partition pattern syntax can be readily manipulated with graphical user interfaces or command-line interfaces (CLIs). In one implementation, a partition pattern can be created using the following CLI command forms:

```
parpat <name> <attributes>
parpat <name> remove
```

Accordingly, the following CLI commands would reproduce the partition pattern set forth above above:

```
parpat /Incoming/*/LatencyInsensitive/* weight ($1)
parpat /Incoming/*/LatencyInsensitive/** weight (10)
parpat /Incoming/*/Pest size(0, 5%)
parpat /Incoming/*/SAP size(0, 1M)
parpat /Incoming/* root size($1, $1)
parpat /Incoming/*/** size(0, 7%)
parpat /Incoming/*/SAP remove
parpat /Incoming/*/Pest size(0, 3%)
save
```

Lastly, although the present invention has been described as operating in connection with end systems employing the TCP and IP protocols, the present invention has application in computer network environments employing any suitable transport layer and network layer protocols. Moreover, while the embodiments including the CaD layer described above operate primarily to create partitions for allocation of bandwidth, the CaD layer can be used in connection with other processes as well, such as measurement engine 140. For example, a user may configure a policy action of
policy measure NumericCounts/Outbound/[CustomerName]/[BranchOffice]/[ServiceName]
and have a Measurement Engine CaD Layer, using a Measurement Pattern (MePat), create and destroy named measurement buckets (for example, "/Outbound/Enwrong/Houston/Gnutella") on demand. In one implementation, the measurement pattern (MePat) includes a hierarchy of named nodes and node creation (*) and default (**) entries. In addition, as opposed to partition parameters, each node may include measurement variables defining the measurements to track for the data flows matching a given node, as well as measurement intervals and measurement variables. For example, a VoIP traffic node can include measurements for jitter, packet loss, latency, etc., while HTTP traffic could be server delay parameters, network efficiency, etc. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. A method, comprising:
maintaining, in a memory of a network application traffic management device, a partition pattern and a policy action, wherein the partition pattern defines a partition hierarchy comprising at least one variable entry at one or more levels of the partition hierarchy;
allocating, at the network application traffic management device, bandwidth to data flows traversing the network application traffic management device according to the partition hierarchy;
applying at least one policy action to a data flow to identify a partition name, wherein the partition name comprises a plurality of partition identifiers arranged in a hierarchy; and
applying the partition pattern against the partition name creating one or more partitions in the partition hierarchy by, in part, accessing a database against one or more attributes of the data flow to resolve the at least one variable entry at the one or more levels of the partition hierarchy and identify node names corresponding to the at least one variable entry, and substituting the identified node names for the variable entries in the partition pattern.

2. The method of claim 1 wherein the partition pattern comprises at least one creation entry.

3. The method of claim 1 wherein the partition pattern comprises at least one default entry.

4. The method of claim 1 further comprising classifying the data flow to the policy action from a plurality of policy actions.

5. An apparatus for allocating network resources comprising:
one or more network interfaces;
a memory;
a processor;
a partition module, physically stored in a storage medium, comprising instructions that, when executed, cause the processor of the apparatus to:
allocate bandwidth to data flows traversing the apparatus according to a partition hierarchy;
apply at least one policy action stored in the memory to a data flow to identify a partition name, wherein the partition name comprises a plurality of partition identifiers arranged in a hierarchy;
apply a partition pattern stored in the memory against the partition name creating one or more partitions in the partition hierarchy by, in part, accessing a database against one or more attributes of the data flow to resolve at least one variable entry at the one or more levels of the partition hierarchy and identify node names corresponding to the at least one variable entry, and substituting the identified node names for the variable entries in the partition pattern;
wherein the partition pattern defines the partition hierarchy comprising the at least one variable entry at one or more levels of the partition hierarchy.

6. The apparatus of claim 5 wherein the partition pattern comprises at least one creation entry.

7. The apparatus of claim 5 wherein the partition pattern comprises at least one default entry.

8. The apparatus of claim 5 wherein the partition module further comprises instructions that, when executed, cause the processor of the apparatus to classify the data flow to the policy action from a plurality of policy actions.

9. An apparatus for allocating network resources comprising:
one or more network interfaces;
a memory;
a processor;
a node creation and deletion module, physically stored in a storage medium, comprising instructions that, when executed, cause the processor and the apparatus to:
apply at least one policy action stored in the memory to a data flow to identify a hierarchical node name, wherein the hierarchical node name comprises a plurality of node names arranged in a hierarchy;
apply a hierarchical pattern stored in the memory against the hierarchical node name creating one or more nodes in the node hierarchy by, in part, accessing a database against one or more attributes of the data flow to resolve at least one variable entry at the one or more levels of the hierarchical pattern and identify node names corresponding to the at least one variable entry, and
substituting the identified node names for the variable entries in the hierarchical pattern;
wherein the partition pattern defines the partition hierarchy comprising the at least one variable entry at one or more levels of the partition hierarchy.

10. The apparatus of claim 9 wherein the hierarchical pattern comprises at least one creation entry.

11. The apparatus of claim 9 wherein at least one node in the hierarchical pattern includes at least one policy.

12. The apparatus of claim 9 wherein the at least one policy is a measurement policy.

13. The apparatus of claim 12 further comprising a measurement engine, physically stored in the storage medium, comprising instructions that, when executed, cause the processor and the apparatus to apply the measurement policy associated with data flows that correspond to the hierarchical node.

* * * * *